United States Patent
Lu et al.

(10) Patent No.: US 7,722,258 B2
(45) Date of Patent: *May 25, 2010

(54) INTERFACE CONVERTER FOR SC FIBER OPTIC CONNECTORS

(75) Inventors: Yu Lu, Eden Prairie, MN (US); Randy Reagan, Clinton, MA (US); Dennis Cheatham, Richardson, TX (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/115,982

(22) Filed: May 6, 2008

(65) Prior Publication Data

US 2008/0273840 A1 Nov. 6, 2008

Related U.S. Application Data

(60) Provisional application No. 60/916,296, filed on May 6, 2007, provisional application No. 60/948,860, filed on Jul. 10, 2007, provisional application No. 61/004,045, filed on Nov. 21, 2007.

(51) Int. Cl.
*G02B 6/36* (2006.01)

(52) U.S. Cl. .......................................... 385/53; 385/78
(58) Field of Classification Search ................... 385/78, 385/53
See application file for complete search history.

(56) References Cited

U.S. PATENT DOCUMENTS

| | | | |
|---|---|---|---|
| 4,140,366 A | 2/1979 | Makuch et al. | |
| 4,140,367 A | 2/1979 | Makuch et al. | |
| 4,142,776 A | 3/1979 | Cherin et al. | |
| 4,174,882 A | 11/1979 | McCartney | |
| 4,225,214 A | 9/1980 | Hodge et al. | |
| 4,279,467 A | 7/1981 | Borsuk et al. | |
| 4,354,731 A | 10/1982 | Mouissie | |
| 4,684,205 A | 8/1987 | Margolin et al. | |

(Continued)

FOREIGN PATENT DOCUMENTS

DE 35 37 684 A1 4/1987

(Continued)

OTHER PUBLICATIONS

U.S. Appl. No. 12/115,966, filed May 6, 2008 entitled "Mechanical Interface Converter for Making Non-Ruggedized Fiber Optic Connectors Compatible with a Ruggedized Fiber Optic Adapter".

(Continued)

*Primary Examiner*—Uyen-Chau N Le
*Assistant Examiner*—Kajli Prince
(74) *Attorney, Agent, or Firm*—Merchant & Gould P.C.

(57) ABSTRACT

An interface converter is provided for mechanically and optically coupling a fiber optic connector with an adapter port. In a preferred embodiment, the interface converter attaches to an SC fiber optic connector and together form a converted fiber optic connector compatible with the adapter port. In certain embodiments, a retractable release sleeve may be removed from the SC fiber optic connector prior to attaching the interface converter. In certain embodiments, the interface converter may be inserted into the adapter port prior to being attached to the SC fiber optic connector.

16 Claims, 23 Drawing Sheets

U.S. PATENT DOCUMENTS

| | | | |
|---|---|---|---|
| 4,705,352 | A | 11/1987 | Margolin et al. |
| 4,715,675 | A | 12/1987 | Kevern et al. |
| 4,725,120 | A | 2/1988 | Parzygnat |
| 4,793,683 | A | 12/1988 | Cannon, Jr. et al. |
| 4,820,185 | A | 4/1989 | Moulin |
| 4,902,238 | A | 2/1990 | Iacobucci |
| 4,907,853 | A | 3/1990 | Hiratsuka |
| 4,961,623 | A | 10/1990 | Midkiff et al. |
| 5,042,901 | A | 8/1991 | Merriken et al. |
| 5,104,242 | A | 4/1992 | Ishikawa |
| 5,212,752 | A | 5/1993 | Stephenson et al. |
| 5,214,830 | A | 6/1993 | Rozycki |
| 5,267,342 | A | 11/1993 | Takahashi et al. |
| 5,276,750 | A | 1/1994 | Manning |
| 5,283,848 | A | 2/1994 | Abendschein et al. |
| 5,317,663 | A | 5/1994 | Beard et al. |
| 5,465,313 | A | 11/1995 | Belenkiy et al. |
| 5,590,229 | A | 12/1996 | Goldman et al. |
| 5,633,970 | A | 5/1997 | Olson et al. |
| 5,715,342 | A | 2/1998 | Nodfelt et al. |
| 5,751,874 | A | 5/1998 | Chudoba |
| 5,778,122 | A | 7/1998 | Giebel et al. |
| 5,887,095 | A | 3/1999 | Nagase |
| 5,892,870 | A | 4/1999 | Fingler et al. |
| 5,920,669 | A | 7/1999 | Knecht et al. |
| 5,923,804 | A | 7/1999 | Rosson |
| 5,940,559 | A | 8/1999 | Noll |
| 5,946,436 | A | 8/1999 | Takashi |
| 5,971,625 | A | 10/1999 | Lu |
| 5,971,626 | A * | 10/1999 | Knodell et al. ............... 385/60 |
| 5,993,071 | A | 11/1999 | Hultermans |
| 6,149,313 | A | 11/2000 | Giebel et al. |
| 6,151,432 | A | 11/2000 | Nakajima et al. |
| RE37,028 | E | 1/2001 | Cooke et al. |
| 6,179,475 | B1 | 1/2001 | Takamatsu et al. |
| 6,186,670 | B1 | 2/2001 | Austin et al. |
| 6,188,822 | B1 | 2/2001 | McAlpine et al. |
| RE37,079 | E | 3/2001 | Stephenson et al. |
| RE37,080 | E | 3/2001 | Stephenson et al. |
| 6,206,579 | B1 | 3/2001 | Selfridge et al. |
| 6,234,683 | B1 | 5/2001 | Waldron et al. |
| 6,234,685 | B1 | 5/2001 | Carlisle et al. |
| 6,254,278 | B1 | 7/2001 | Andrews et al. |
| 6,264,374 | B1 | 7/2001 | Selfridge et al. |
| 6,298,190 | B2 | 10/2001 | Waldron et al. |
| 6,305,849 | B1 | 10/2001 | Roehrs et al. |
| 6,357,929 | B1 | 3/2002 | Roehrs et al. |
| 6,371,660 | B1 | 4/2002 | Roehrs et al. |
| 6,419,402 | B1 | 7/2002 | Zimmel |
| 6,427,035 | B1 | 7/2002 | Mahony |
| 6,428,215 | B1 | 8/2002 | Nault |
| 6,461,057 | B2 | 10/2002 | Chen |
| 6,466,725 | B2 | 10/2002 | Battey et al. |
| 6,496,641 | B1 | 12/2002 | Mahony |
| 6,522,804 | B1 | 2/2003 | Mahony |
| 6,539,147 | B1 | 3/2003 | Mahony |
| 6,540,410 | B2 | 4/2003 | Childers et al. |
| 6,542,674 | B1 | 4/2003 | Gimblet |
| 6,546,175 | B1 | 4/2003 | Wagman et al. |
| 6,568,861 | B2 | 5/2003 | Benner et al. |
| 6,579,014 | B2 | 6/2003 | Melton et al. |
| 6,614,980 | B1 | 9/2003 | Mahony et al. |
| 6,619,697 | B2 | 9/2003 | Griffioen et al. |
| 6,625,375 | B1 | 9/2003 | Mahony |
| 6,629,782 | B2 | 10/2003 | McPhee et al. |
| 6,648,520 | B2 | 11/2003 | McDonald et al. |
| 6,652,156 | B2 | 11/2003 | Shinagawa et al. |
| 6,655,851 | B1 | 12/2003 | Lee |
| 6,668,127 | B1 | 12/2003 | Mahony |
| 6,678,448 | B2 | 1/2004 | Moisel et al. |
| 6,685,361 | B1 | 2/2004 | Rubino et al. |
| 6,695,489 | B2 | 2/2004 | Nault |
| 6,702,478 | B2 | 3/2004 | Inagaki et al. |
| 6,714,710 | B2 | 3/2004 | Gimblet |
| 6,739,759 | B1 | 5/2004 | Seeley |
| 6,783,281 | B2 | 8/2004 | Cheng |
| 6,785,450 | B2 | 8/2004 | Wagman et al. |
| 6,789,950 | B1 | 9/2004 | Loder et al. |
| 6,817,902 | B2 | 11/2004 | Bernardi et al. |
| 6,848,836 | B2 | 2/2005 | Ueda et al. |
| 6,899,467 | B2 | 5/2005 | McDonald et al. |
| 6,909,821 | B2 | 6/2005 | Ravasio et al. |
| 6,916,120 | B2 | 7/2005 | Zimmel et al. |
| 6,962,445 | B2 | 11/2005 | Zimmel et al. |
| 7,044,650 | B1 | 5/2006 | Tran et al. |
| 7,090,406 | B2 | 8/2006 | Melton et al. |
| 7,090,407 | B2 | 8/2006 | Melton et al. |
| 7,111,990 | B2 | 9/2006 | Melton et al. |
| 7,113,679 | B2 | 9/2006 | Melton et al. |
| 7,137,742 | B2 | 11/2006 | Theuerkorn et al. |
| 7,146,090 | B2 | 12/2006 | Vo et al. |
| 7,201,518 | B2 | 4/2007 | Holmquist |
| 7,204,644 | B2 | 4/2007 | Barnes et al. |
| 7,207,727 | B2 | 4/2007 | Tran et al. |
| 7,234,877 | B2 | 6/2007 | Sedor |
| 7,244,066 | B2 | 7/2007 | Theuerkorn |
| 7,264,402 | B2 | 9/2007 | Theuerkorn et al. |
| 7,292,763 | B2 | 11/2007 | Smith et al. |
| 7,317,863 | B2 | 1/2008 | Lu et al. |
| 7,331,719 | B2 | 2/2008 | Manning et al. |
| 7,346,256 | B2 | 3/2008 | Marrs et al. |
| 7,380,992 | B2 | 6/2008 | Kramer et al. |
| 2001/0012428 | A1 | 8/2001 | Nakajima et al. |
| 2001/0036345 | A1 | 11/2001 | Gimblet et al. |
| 2002/0022392 | A1 | 2/2002 | Below et al. |
| 2002/0062978 | A1 | 5/2002 | Sakabe et al. |
| 2002/0081077 | A1 | 6/2002 | Nault |
| 2003/0063867 | A1 | 4/2003 | McDonald et al. |
| 2003/0094298 | A1 | 5/2003 | Morrow et al. |
| 2003/0095754 | A1 | 5/2003 | Matsumoto et al. |
| 2003/0095780 | A1 | 5/2003 | Chang |
| 2004/0017983 | A1 | 1/2004 | Chen et al. |
| 2004/0033028 | A1 | 2/2004 | Cheng |
| 2004/0038588 | A1 | 2/2004 | Bernardi et al. |
| 2004/0047566 | A1 | 3/2004 | McDonald et al. |
| 2004/0120663 | A1 | 6/2004 | Lail et al. |
| 2004/0223699 | A1 | 11/2004 | Melton et al. |
| 2004/0223720 | A1 | 11/2004 | Melton et al. |
| 2004/0228589 | A1 | 11/2004 | Melton et al. |
| 2005/0041928 | A1* | 2/2005 | Zimmel et al. ............... 385/55 |
| 2005/0064752 | A1 | 3/2005 | Serino |
| 2005/0117850 | A1 | 6/2005 | Milette |
| 2005/0232553 | A1 | 10/2005 | Holmquist |
| 2006/0056769 | A1 | 3/2006 | Khemakhem et al. |
| 2006/0088247 | A1 | 4/2006 | Tran et al. |
| 2006/0088248 | A1 | 4/2006 | Tran et al. |
| 2006/0089049 | A1 | 4/2006 | Sedor |
| 2006/0115219 | A1 | 6/2006 | Mudd et al. |
| 2007/0025665 | A1 | 2/2007 | Dean, Jr. et al. |
| 2007/0077010 | A1 | 4/2007 | Melton et al. |
| 2008/0044137 | A1* | 2/2008 | Luther et al. ............... 385/60 |
| 2008/0131132 | A1 | 6/2008 | Solheid et al. |
| 2008/0175541 | A1 | 7/2008 | Lu et al. |
| 2008/0175542 | A1 | 7/2008 | Lu et al. |
| 2008/0175546 | A1 | 7/2008 | Lu et al. |

FOREIGN PATENT DOCUMENTS

| | | |
|---|---|---|
| DE | 10 2004 049 697 A1 | 4/2006 |
| EP | 0 156 075 A2 | 10/1985 |
| EP | 0 547 778 A1 | 6/1993 |
| EP | 0 581 527 A1 | 2/1994 |
| EP | 0 689 069 A1 | 12/1995 |
| EP | 0 762 171 A1 | 3/1997 |

| | | |
|---|---|---|
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 997 757 A2 | 5/2000 |
| EP | 1 065 542 A1 | 1/2001 |
| EP | 1 258 758 A2 | 11/2002 |
| EP | 1 333 537 A1 | 8/2003 |
| EP | 1 457 793 A2 | 9/2004 |
| EP | 1 566 674 A1 | 8/2005 |
| GB | 2 154 333 A | 9/1985 |
| JP | 62-54204 | 3/1987 |
| JP | 5-106765 | 4/1993 |
| JP | 2001-116968 | 4/2001 |
| WO | WO 94/15232 | 7/1994 |
| WO | WO 00/31575 | 6/2000 |
| WO | WO 03/073819 A2 | 9/2003 |
| WO | WO 2005/072395 A2 | 8/2005 |

OTHER PUBLICATIONS

U.S. Appl. No. 12/203,508, filed Sep. 3, 2008 entitled "Hardened Fiber Optic Connector Compatible with Hardened and Non-Hardened Fiber Optic Adapters".

U.S. Appl. No. 12/203,522, filed Sep. 3, 2008 entitled "Hardened Fiber Optic Connection System".

U.S. Appl. No. 12/203,530, filed Sep. 3, 2008 entitled "Hardened Fiber Optic Connection System with Multiple Configurations".

U.S. Appl. No. 12/203,535, filed Sep. 3, 2008 entitled "Hardened Fiber Optic Connector and Cable Assembly with Multiple Configurations".

Delphi Connection Systems, "Harsh Environment Hermaphroditic Fiber Optic Connectors," 16 pages (© 2002).

Opti Tap™ Connector. An Evolant Solutions Product, 2 pages (Sep. 2005).

Stratos Lightwave™ Brochure, "HDLC Hermaphroditic Butt Joint Connector," 2 pages (Undated).

Stratos Lightwave™ Brochure, "HQLC Hermaphroditic Butt Joint Connector," 2 pages (Undated).

International Search Report and Written Opinion mailed Sep. 18, 2008.

* cited by examiner

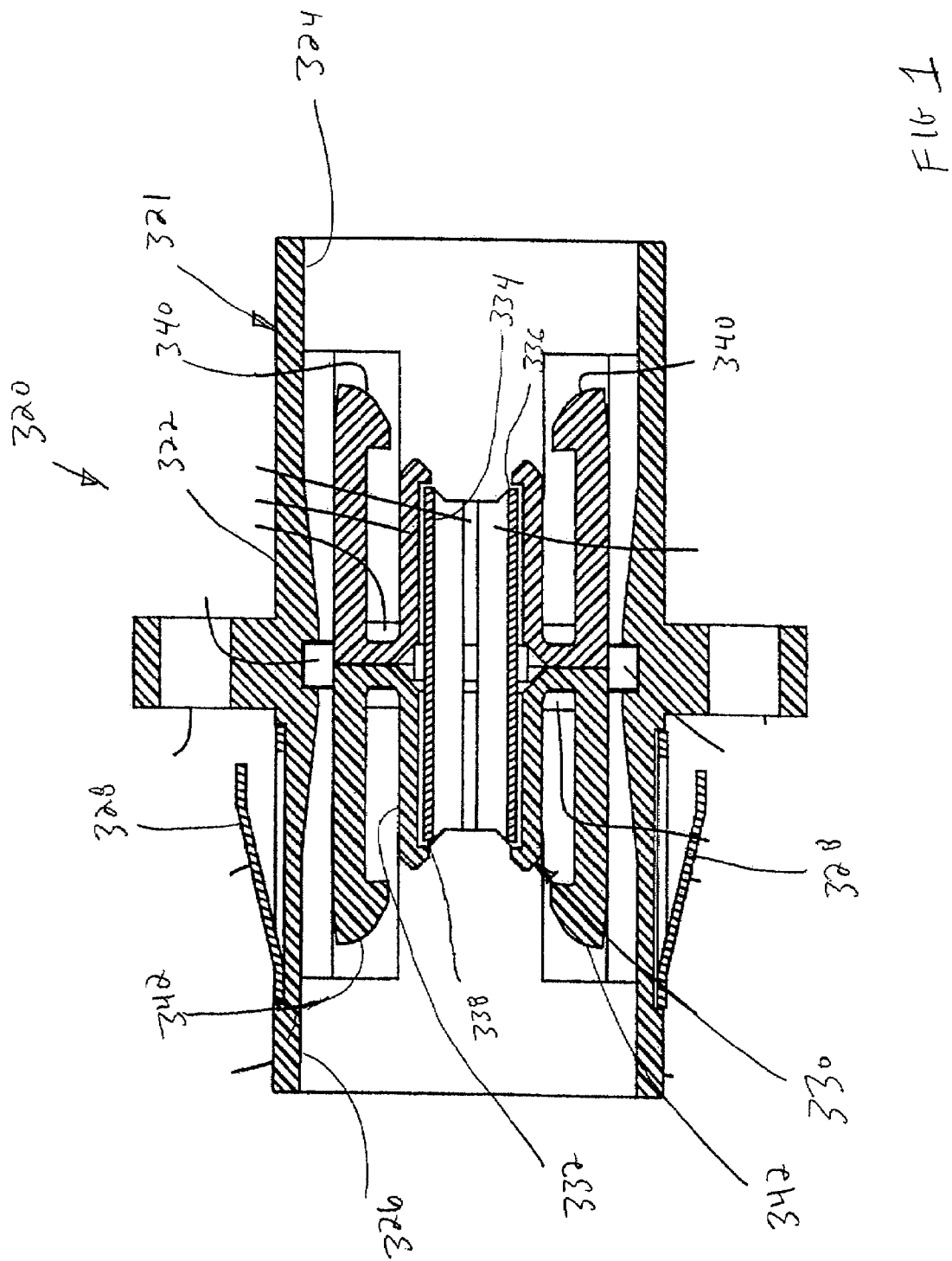

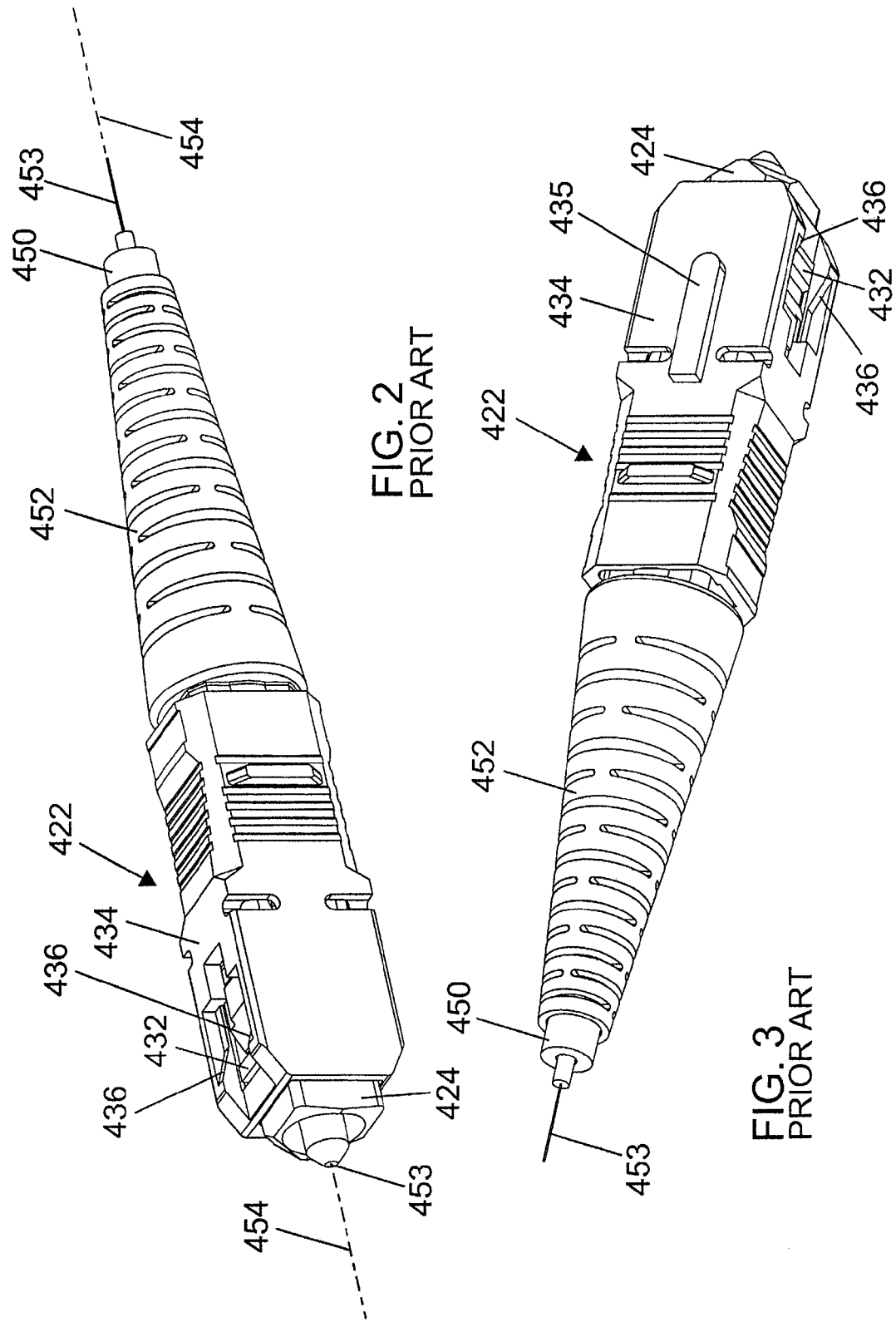

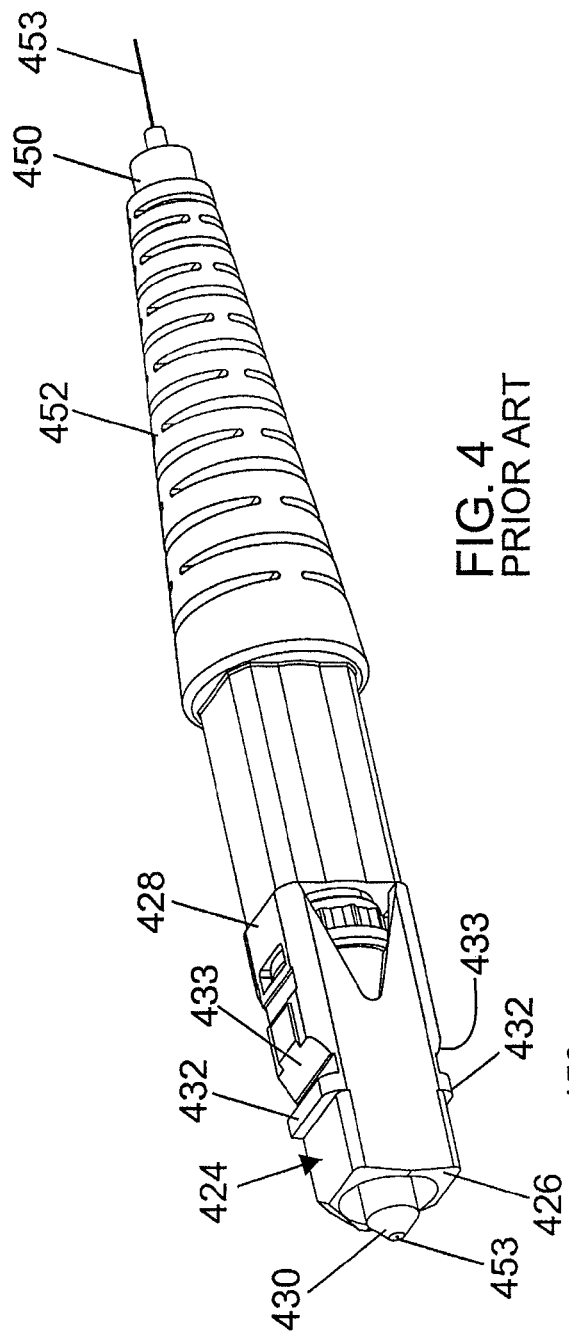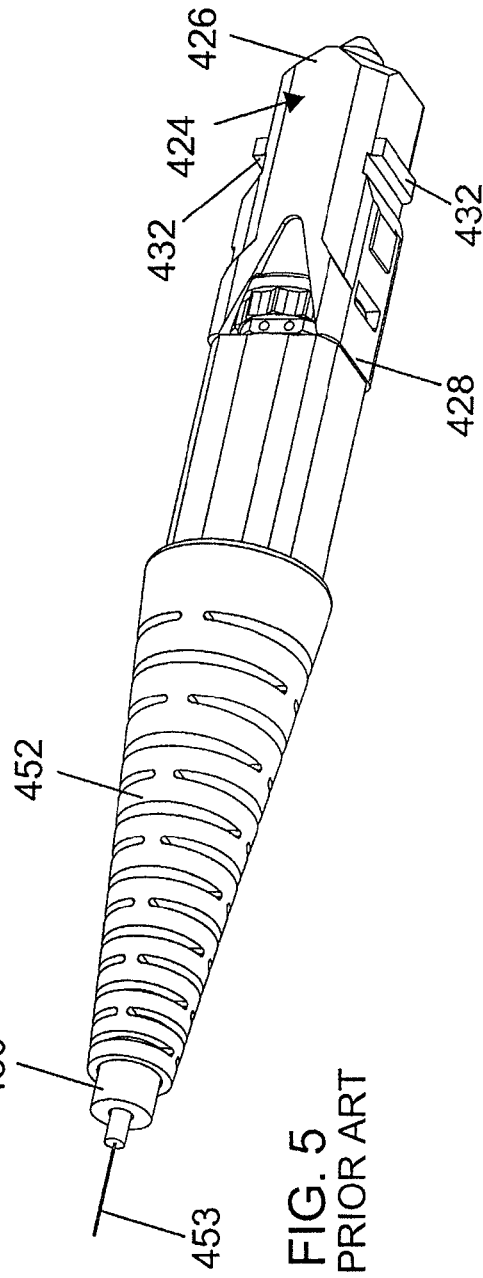
FIG. 4
PRIOR ART
FIG. 5
PRIOR ART

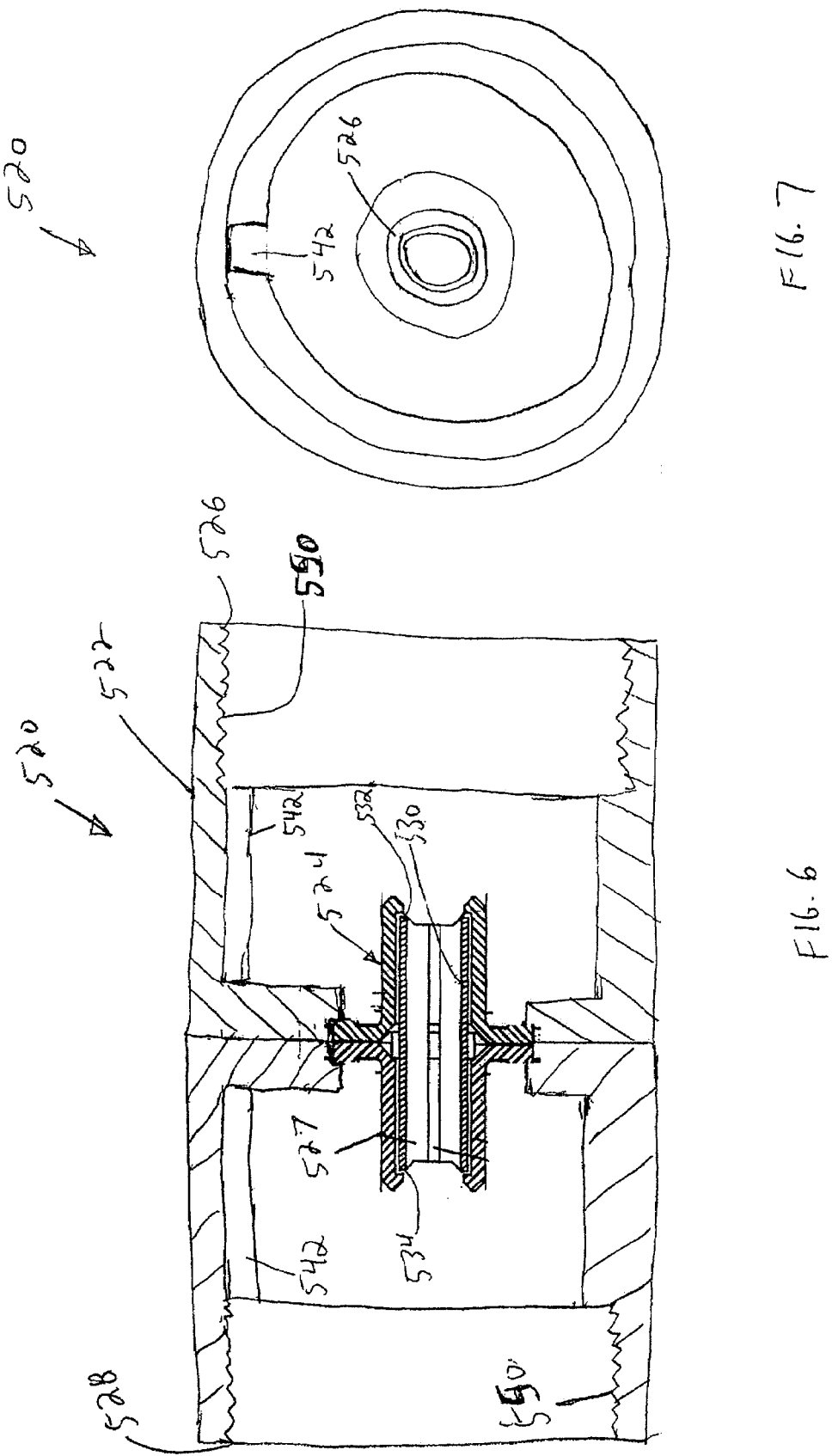

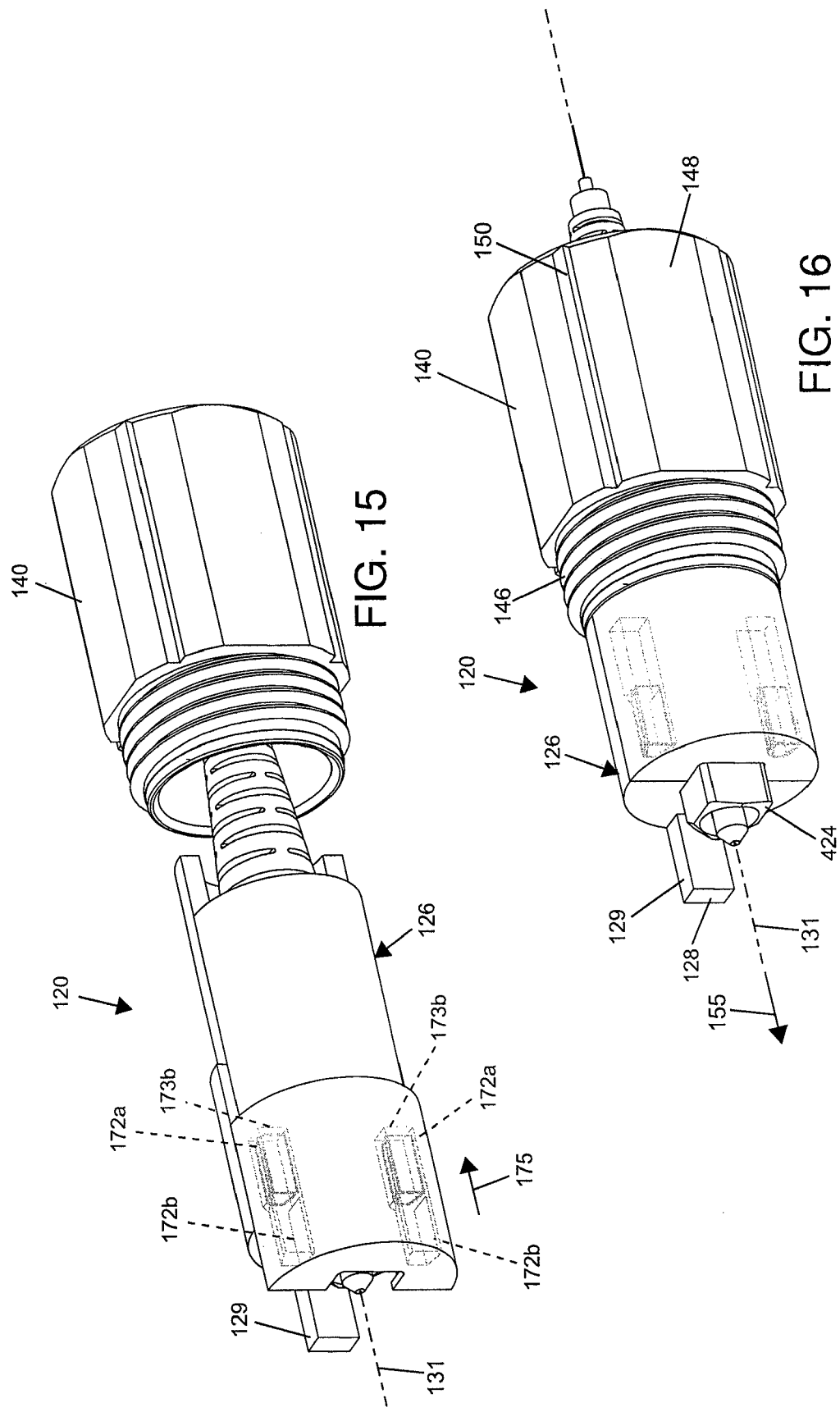

INTERFACE CONVERTER FOR SC FIBER OPTIC CONNECTORS

CROSS-REFERENCE TO RELATED APPLICATIONS

The present application claims the benefit of U.S. Provisional Patent Application Ser. No. 60/916,296, filed May 6, 2007, U.S. Provisional Patent Application Ser. No. 60/948,860, filed Jul. 10, 2007 and U.S. Provisional Patent Application Ser. No. 61/004,045, filed Nov. 21, 2007, which applications are hereby incorporated by reference in their entirety.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and an adapter for mechanically and optically coupling the fiber optic connectors together. Fiber optic connectors generally include ferrules that support the ends of the optical fibers of the fiber optic cables. The end faces of the ferrules are typically polished and are often angled. The adapter includes co-axially aligned ports (i.e., receptacles) for receiving the fiber optic connectors desired to be interconnected. The adapter includes an internal split sleeve that receives and aligns the ferrules of the fiber optic connectors when the connectors are inserted within the ports of the adapter. With the ferrules and their associated fibers aligned within the sleeve of the adapter, a fiber optic signal can pass from one fiber to the next. The adapter also typically has a mechanical fastening arrangement (e.g., a snap-fit arrangement) for mechanically retaining the fiber optic connectors within the adapter.

FIG. 1 shows a prior art SC style adapter 320 that is frequently used in fiber optic telecommunications systems. The SC style adapter 320 includes a housing 321 having an outer portion 322 defining first and second oppositely positioned ports 324, 326. Resilient fingers 328 are provided on the outer portion 322 for use in retaining the adapter 320 within a mounting opening (e.g., an opening within a panel) by a snap fit connection. The housing 321 also includes an inner portion 330 positioned within the outer portion 322. The inner portion 330 includes a cylindrical split sleeve holder 332 in which a split sleeve 334 is mounted. The split sleeve 334 has a first end 336 accessible from the first port 324 and a second end 338 accessible from the second port 326. The inner portion 330 also includes a first pair of resilient latches 340 positioned at the first port 324 and a second pair of resilient latches 342 positioned at the second port 326.

FIGS. 2 through 5 show a prior art SC style fiber optic connector 422 that is compatible with the adapter 320. The connector 422 includes a connector body 424 in which a ferrule assembly is mounted. The connector body 424 includes a first end 426 positioned opposite from a second end 428. The first end 426 provides a connector interface at which a ferrule 430 of the ferrule assembly is supported. Adjacent the first end 426, the connector body 424 includes retention shoulders 432 that are engaged by the resilient latches 340 of the adapter 320 when the connector 422 is inserted in the first port 324 of the adapter 320, or that are engaged by the resilient latches 342 when the connector 422 is inserted in the second port 326 of the adapter 320. The latches 340, 342 function to retain SC connectors the within their respective ports 324, 326. The second end 428 of the connector body 424 is adapted to receive a fiber optic cable 450 having a fiber 453 that terminates in the ferrule 430. A resilient boot 452 can be positioned at the second end 428 of the connector body 424 to provide bend radius protection at the interface between the connector body 424 and the fiber optic cable 450.

The connector 422 also includes a retractable release sleeve 434 that mounts over the connector body 424. The release sleeve 434 can be slid back and forth relative to the connector body 424 through a limited range of movement that extends in a direction along a longitudinal axis 454 of the connector 422. The release sleeve 434 includes release ramps 436 that are used to disengage the latches 340, 342 from the retention shoulders 432 when it is desired to remove the connector 422 from a given one of the ports 324, 326. For example, by pulling back (i.e., in a direction toward the second end 428 of the connector body 424) on the retention sleeve 434 while the connector 422 is mounted in a given port 324, 326, the release ramps 436 force the corresponding latches 340, 342 apart from one another a sufficient distance to disengage the latches 340, 342 from the retention shoulders 432 so that the connector 422 can be removed from the port 324, 326. The release sleeve 434 includes a keying rail 435 that fits within keying slots of the outer housing 322 to ensure proper rotational alignment of the connector 422 within the adapter 320. When two of the connectors 422 are latched within the port 324, 326 of the adapter 320, the ferrules 430 of the connectors 422 fits within the first and second ends 336, 338 of the split sleeve 334 and are thereby held in co-axial alignment with one another. Further details regarding SC type fiber optic connectors are disclosed at U.S. Pat. No. 5,317,663, that is hereby incorporated by reference in its entirety.

There are a variety of fiber optic adapter and fiber optic connector configurations that are used in the telecommunications industry. There is a need for techniques that provide compatibility between different styles/configurations of fiber optic components.

SUMMARY

One aspect of the present disclosure relates to an interface converter for allowing a fiber optic connector to be compatible with an adapter port that would otherwise be incompatible with the fiber optic connector.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a cross-sectional view of a prior art SC style fiber optic adapter;

FIG. 2 is a front, top perspective view of a prior art SC style fiber optic connector adapted to be inserted into the fiber optic adapter of FIG. 1;

FIG. 3 is a rear, bottom perspective view of the SC style fiber optic connector of FIG. 2;

FIG. 4 is a front, top perspective view of the SC style fiber optic connector of FIGS. 2 and 3 with an outer release sleeve removed;

FIG. 5 is a rear, bottom perspective view of the SC style fiber optic connector of FIGS. 2 and 3 with the outer release sleeve removed;

FIG. 6 is a cross-sectional view of a fiber optic adapter;

FIG. 7 is an end view of the fiber optic adapter of FIG. 6;

FIG. 15 is a front, side perspective view showing a second assembly step of the interface converter of FIG. 13; and FIG. 16 is a front, side perspective view showing a third assembly step of the interface converter of FIG. 13.

DETAILED DESCRIPTION

Figure 8:
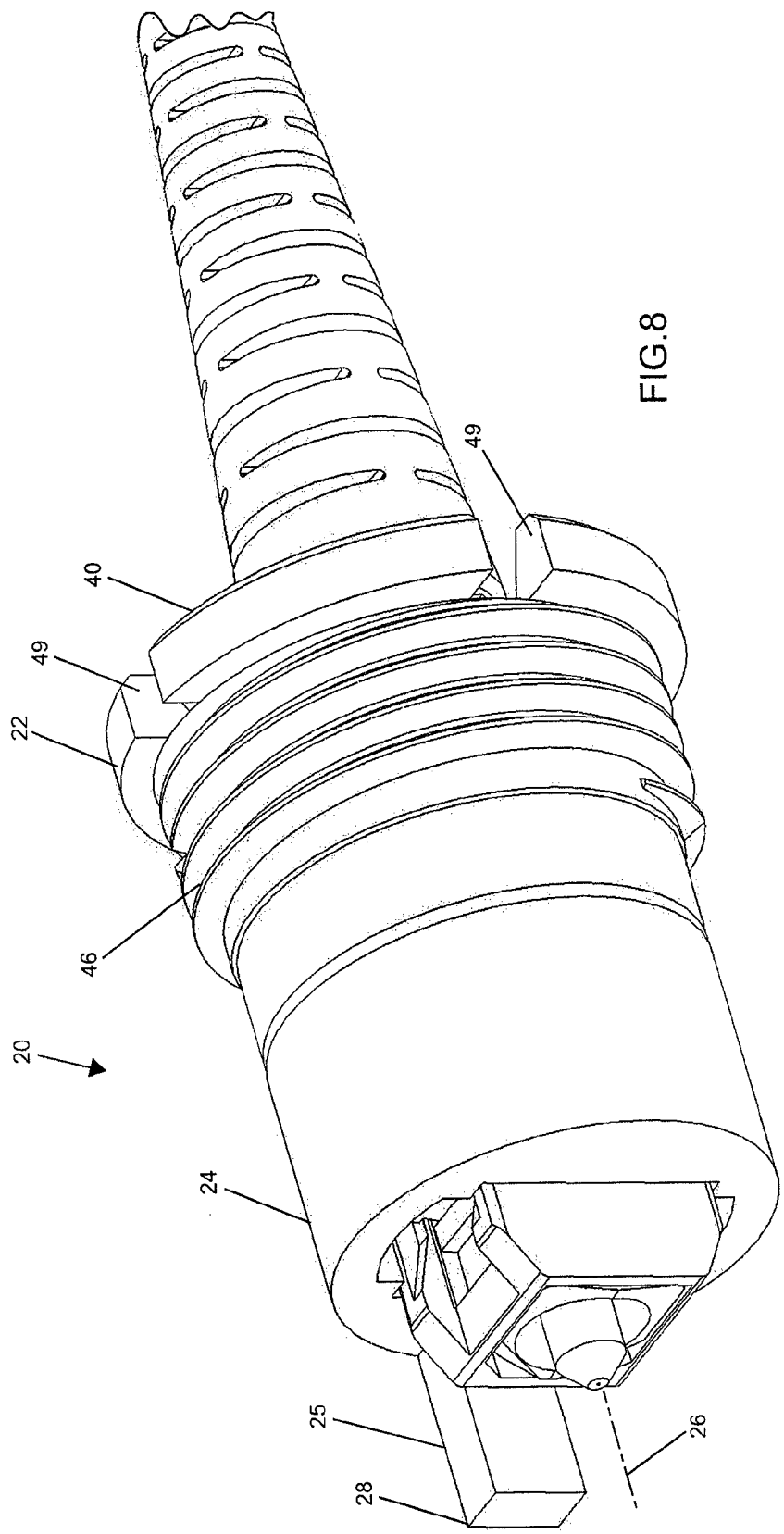
FIG. 8 is a front, top perspective view of a SC style fiber optic connector inserted in an interface converter having features that are examples of inventive aspects in accordance with the principles of the present disclosure.
Figure 9:
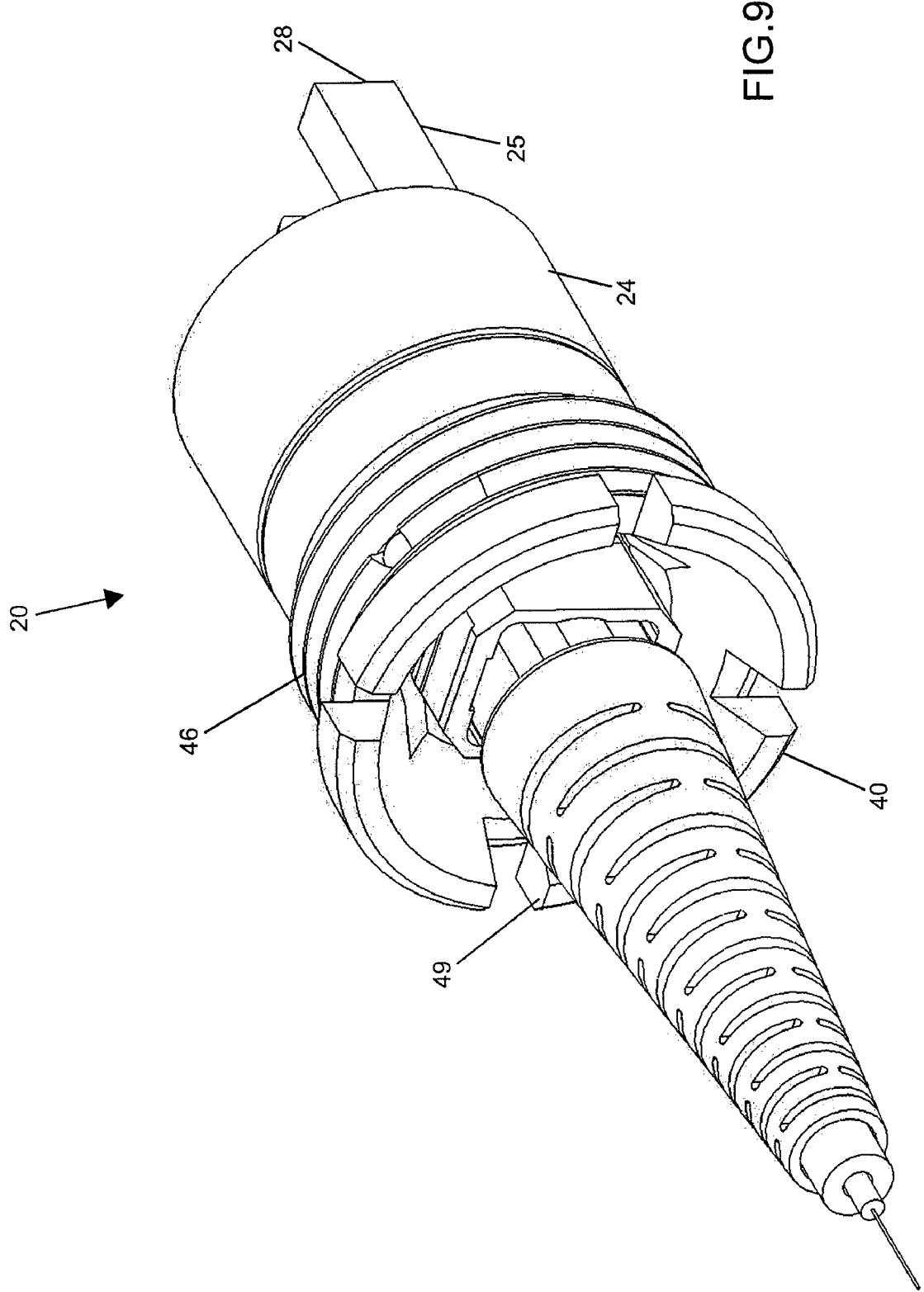
FIG. 9 is a rear, top perspective view of the SC style fiber optic connector inserted in the interface converter of FIG. 8.
Figure 10:
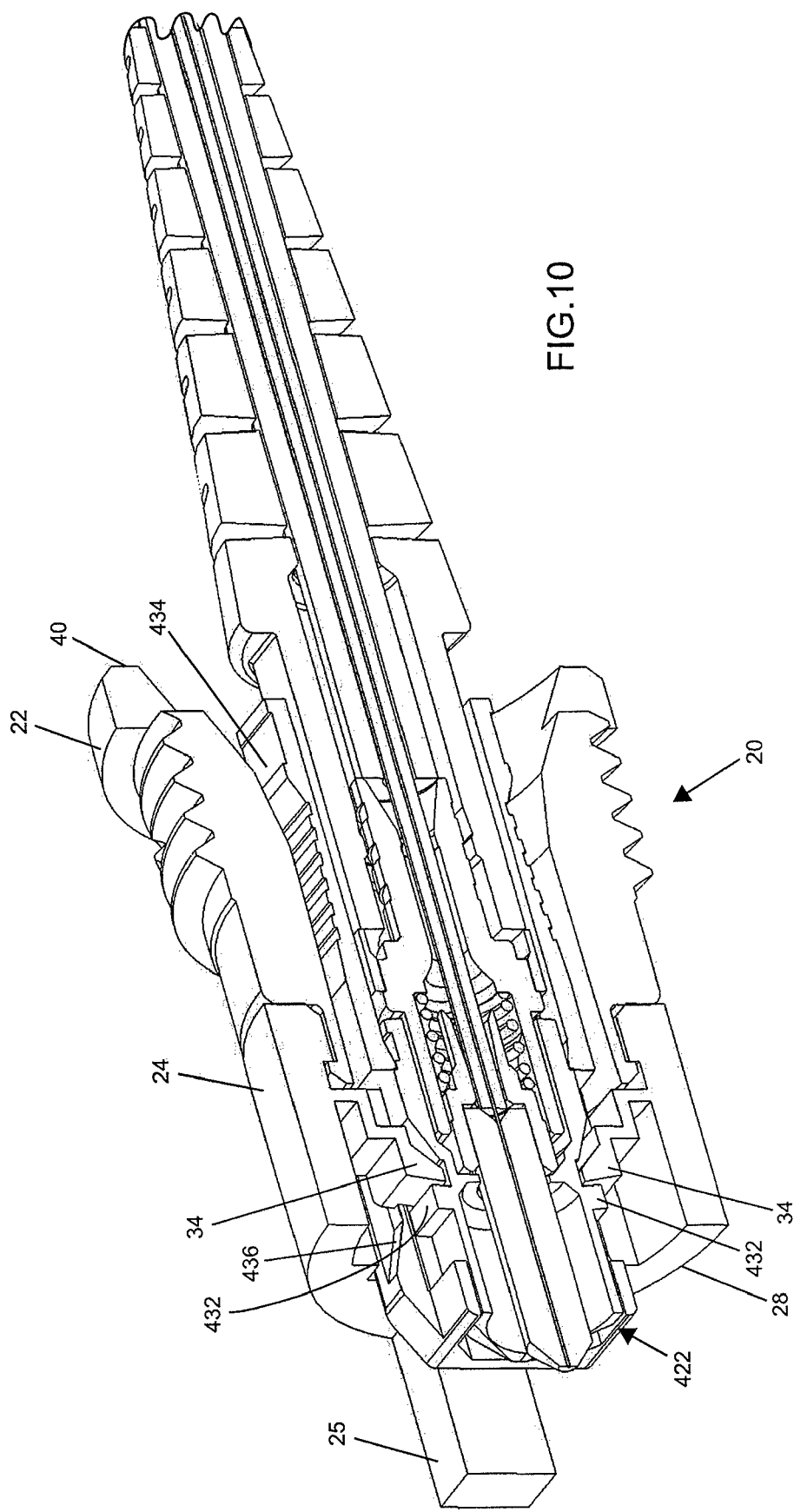
FIG. 10 is a front, top perspective cut-away view cut lengthwise through the SC style fiber optic connector inserted in the interface converter of FIG. 8.
Figure 11:
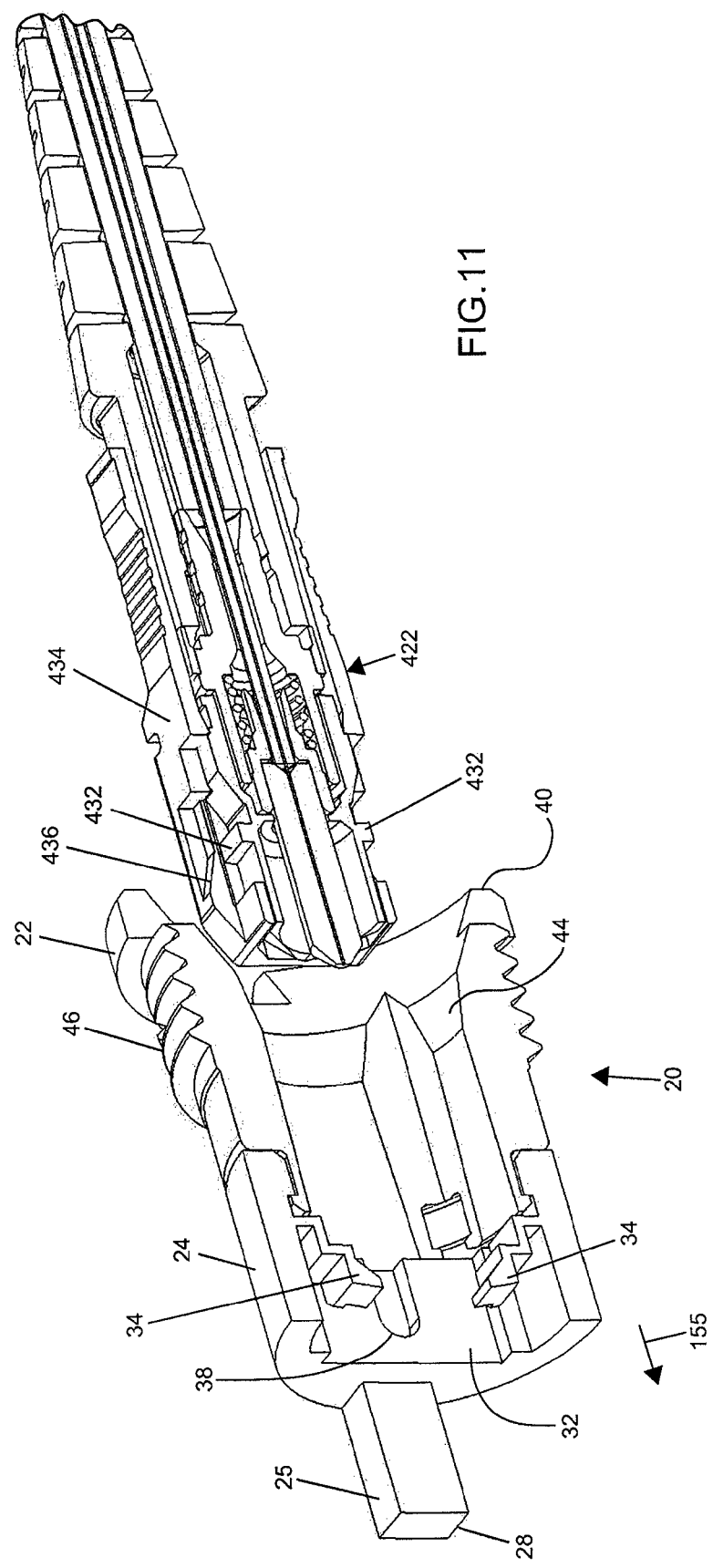
FIG. 11 is a front, top perspective cut-away view cut lengthwise through the SC style fiber optic connector withdrawn from the interface converter of FIG. 8.
Figure 12:
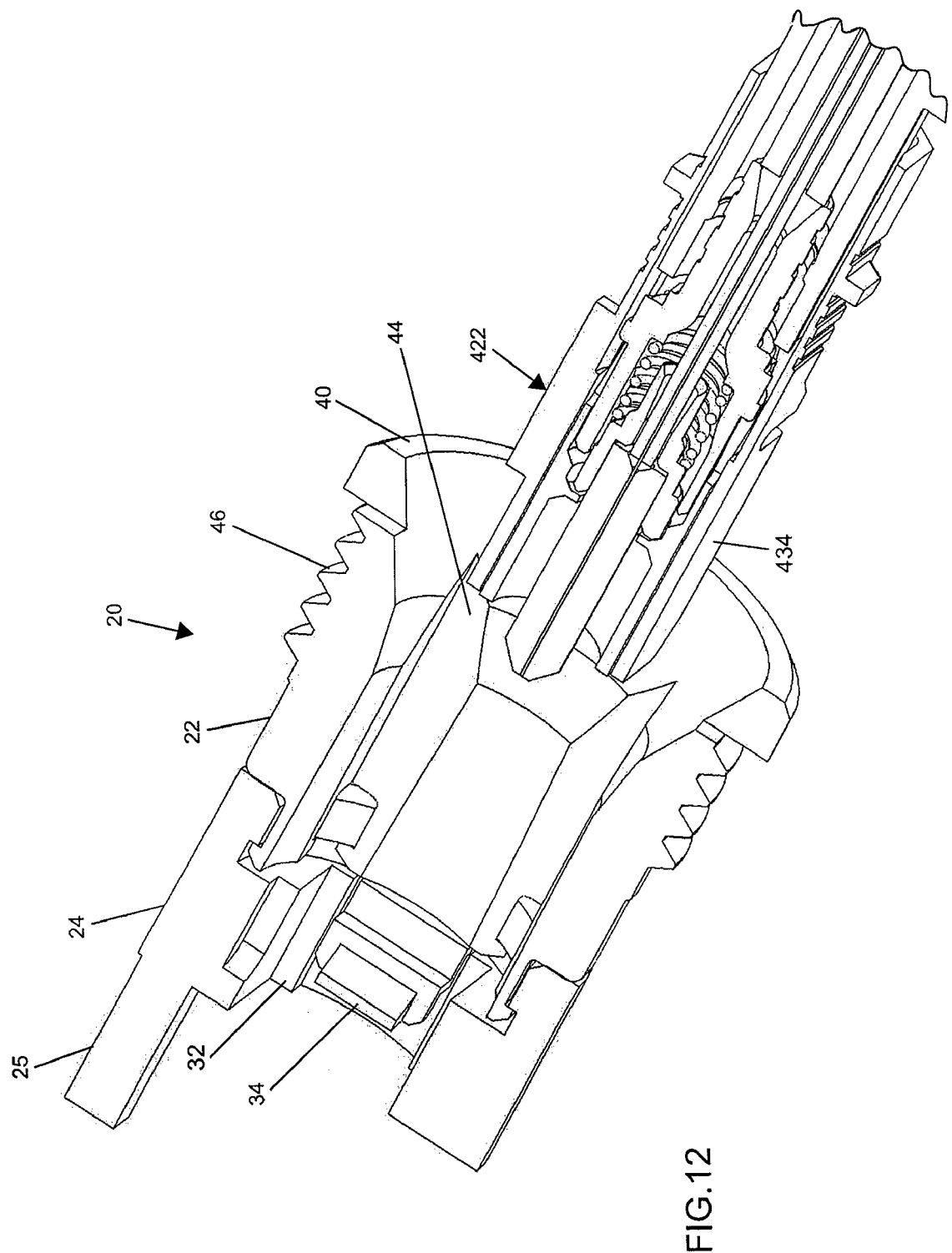
FIG. 12 is a rear, top perspective cut-away view cut lengthwise along the middle through the SC style fiber optic connector withdrawn from the interface converter of FIG. 8.

FIGS. 6 and 7 schematically illustrate a fiber optic adapter 520 having an outer housing 522 and an inner housing 524. The outer housing 522 includes first and second ports 526, 528 positioned at opposite ends of the adapter 520. The inner housing 524 includes a cylindrical split sleeve holder 527 in which a split sleeve 530 is retained. The split sleeve 530 includes a first end 532 positioned at the first port 526 and a second end 534 positioned at the second port 528. The outer housing 522 includes structure for securing fiber optic connectors within the first and second ports 526, 528, and also includes keying structures for ensuring that the fiber optic connectors are oriented at the proper rotational orientation within the first and second ports 526, 528. For example, the outer housing 522 defines inner threads 550 located within the first and second ports 526, 528. The threads 550 are adapted to engage outwardly threaded coupling nuts of fiber optic connectors inserted within the ports 526, 528 to retain the connectors within the ports 526, 528. Also, the outer housing 522 defines keying slots 542 within the ports 526, 528. The keying slots 542 are adapted to receive corresponding key members of fiber optic connectors inserted within the ports 526, 528 to ensure that the fiber optic connectors are oriented at the proper rotational orientation within the first and second ports 526, 528.

For a number of reasons, the SC style fiber optic connector 422 of FIGS. 2 through 5 is not directly compatible with the fiber optic adapter 520 of FIGS. 6 and 7. For example, the fiber optic adapter 520 lacks resilient latches for retaining the fiber optic connector 422 in the ports 526, 528. Also, the keying slots 542 are not designed to work with the keying rail 435 of the connector 422 to ensure that the connector is oriented at the proper rotational orientation within the ports 526, 528.

FIGS. 8 through 12 show an interface converter 20 having features that are examples of inventive aspects in accordance with the principles of the present disclosure. The interface converter 20 is configured to make an SC style fiber optic connector (e.g., the fiber optic connector 422 of FIGS. 2 through 5) compatible with the fiber optic adapter 520 of FIGS. 6 and 7. The ports 526, 528 have the same configuration. Therefore, it will be appreciated that the interface converter 20 can be mounted within either of the ports 526, 528 to make an individual port compatible with an SC style fiber optic connector, or that separate interface converters 20 can be mounted in each of the ports 526, 528 to make the entire adapter compatible with SC style fiber optic connectors. However, for ease of explanation, the interface converter 20 will primarily be described within respect to the first port 526. It will be appreciated that the same description is also applicable to the interface conversion of the second port 528.

The interface converter 20 is configured to provide a mechanical interface suitable for receiving and retaining the fiber optic connector 422 within the first port 526. The interface converter 20 also functions to align the fiber optic connector 422 within the first port 526 such that the ferrule 430 fits within the first end 532 of the split sleeve 530. In addition, the interface converter 20 rotationally orients the fiber optic connector 422 within first port 526. For example, keying rail 435 is seated in a keying slot 38 of the interface converter 20 to rotationally align the connector 422 relative to the interface converter 20. Also, keying rail 25 fits within keying slot 542 to rotationally align the interface converter 20 relative to the adapter 520.

Referring to FIG. 8, the interface converter 20 includes an anchoring piece 22 connected to a connector holder 24 (e.g., by a snap fit connection). The anchoring piece 22 and the connector holder 24 are both aligned along a central longitudinal axis 26 of the interface converter 20. The anchoring piece 22 can be manually rotated relative to the connector holder 24 about the central longitudinal axis 26.

As illustrated in FIGS. 8 through 12, the connector holder 24 forms a first end 28 of the interface converter and is shaped with a mechanical interface that complements or is compatible with the inner shape defined within the port 526 of the fiber optic adapter 520. For example, the connector holder 24 includes a keying rail 25 that fits within the keying slot 542 of the port 526 (see FIGS. 6 through 7) to ensure proper rotational alignment between the connector holder 24 and the port 526. The connector holder 24 is configured to receive and retain the fiber optic connector 422. For example, the connector holder 24 defines a central passage 32 shaped and sized to accommodate the outer shape of the release sleeve 434 of the fiber optic connector 422 (see FIGS. 11 through 12). In this way, the connector 422 can be received within the central passage 32. The connector holder 24 also includes structure for mechanically retaining the fiber optic connector 422 within the central passage 32. For example, the connector holder 24 includes opposing flexible latches 34 configured to interlock with the retention shoulders 432 of the fiber optic connector 422 when the fiber optic connector 422 is inserted in the central passage 32 (see FIG. 10). The interlock between the latches 34 and the retention shoulders 432 functions to retain the fiber optic connector 422 within the central passage 32. The latches 34 can be disengaged from the retention shoulders 432 by pulling back on the release sleeve 434 thereby causing the ramped surfaces 436 of the release sleeve 434 to force the latches 34 apart a sufficient distance to disengage the latches 34 from the retention shoulders 432.

The anchoring piece 22 forms a second end 40 of the interface converter 20. The second end 40 is positioned opposite from the first end 28. The anchoring piece 22 defines a central passage 44 that aligns with the central passage 32 of the connector holder 24. In one embodiment, the central passage 44 is tapered at the second end 40 to provide a transition or lead-in for facilitating inserting the fiber optic connector 422 into the central passage 44. The anchoring piece 22 also includes external threads 46 sized to match or intermate with the internal threads 550 provided within the first port 526 of the fiber optic adapter 520. By threading the anchoring piece 22 within the internal threads 550, the interface converter can be anchored within the first port 526 of the fiber optic adapter 520.

The interface converter 20 can be mounted within the port 526 of the fiber optic adapter 520 to make the port 526 compatible with the fiber optic connector 422. To mount the interface converter 20 within the port 526, the first end 28 of the interface converter 20 is inserted into the port 526 and is manipulated such that the keying rail 25 fits within the corresponding keying slot 542 provided within the port 526. Once the connector holder 24 is properly positioned/seated within the port 526, the anchoring piece 22 is threaded into the internal threads 550 of the port 526 to secure the interface converter 20 in place within the port 526. When mounted within the first port 526, the second end 40 of the interface converter 20 can be flush with the outer portion of the adapter 520. In other embodiments, the second end 40 may be recessed within the port 520 or may project slightly outwardly from the port 526. Notches 49 can be provided at the second end 40. The notches 49 can be sized to interlock with a tool such as a spanner wrench used to turn the anchoring piece 22 within the threads 550.

Once the interface converter 20 is mounted within the port 526, the port 526 can accommodate the fiber optic connector 422. For example, the fiber optic connector 422 can be axially inserted into the port 526 through the second end 40 of the interface converter 20. During insertion, the connector 422 passes through the central passages 44, 32 of the interface converter 20. Insertion continues until the latches 34 interlock with the retention shoulders 432 of the connector 422. Once the latches 34 interlock with the shoulders 432, the connector 422 is retained at a location with the ferrule 430 positioned at an appropriate depth within the first end 532 of the split sleeve 530. The mating relation between the keying slot 38 and the keying rail 435 ensure that the connector 422 is rotationally aligned within the converter 20. The connector 422 can be removed from the interface converter 20 by pulling back on the release sleeve 434. To facilitate grasping the release sleeve 434, an extender can be mounted to the back side of the release sleeve 434.

FIGS. 13 through 16 show another interface converter 120 having features that are examples of inventive aspects in accordance with the principles of the present disclosure. The interface converter 120 is also configured to make an SC style fiber optic connector (e.g., the fiber optic connector 422 of FIGS. 2 through 5) compatible with the fiber optic adapter 520 of FIGS. 6 and 7. The interface converter 120 mounts over the connector body 424 (e.g., with the release sleeve 434 removed) of the connector 422 and provides a mechanical interface suitable for mating and retaining the fiber optic connector 422 within the fiber optic adapter 520. Other embodiments of an interface converter may mount with the release sleeve 434 remaining on the connector 422.

Figure 13:
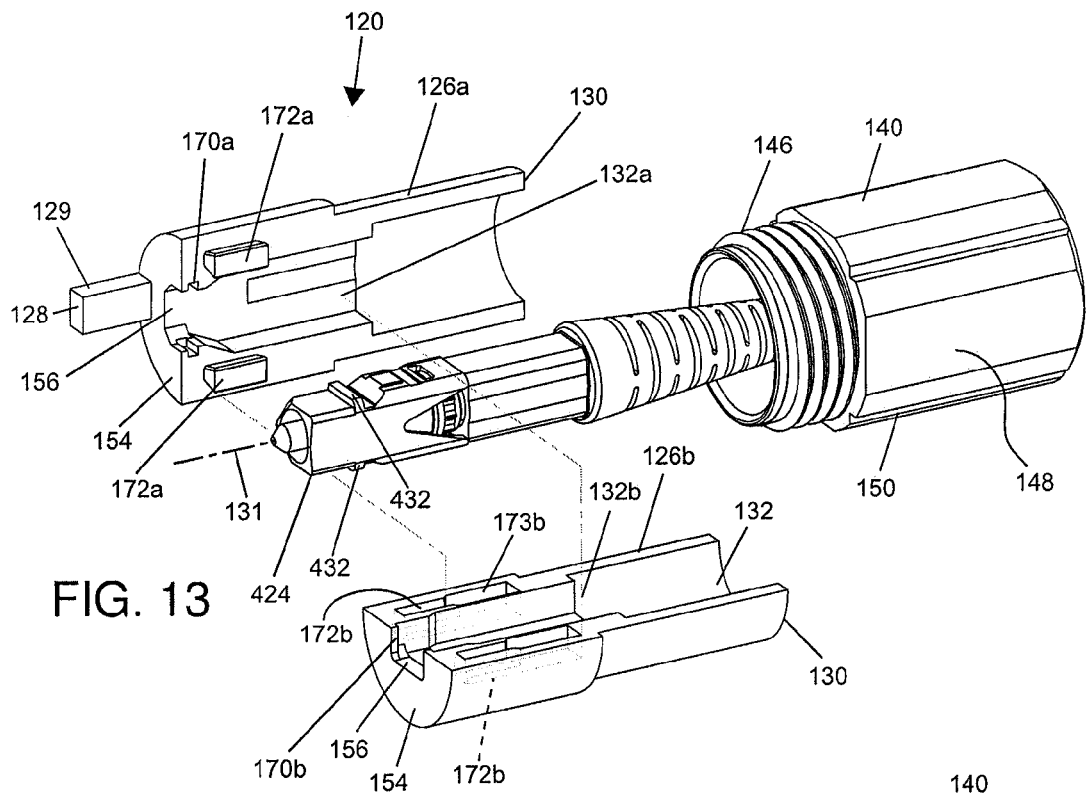
FIG. 13 is a front, side perspective view of another interface converter in an unassembled state having features that are examples of inventive aspects in accordance with the principles of the present disclosure, the interface converter is shown in combination with the connector body of the SC style fiber optic connector of FIGS. 2 through 5.
Figure 14:
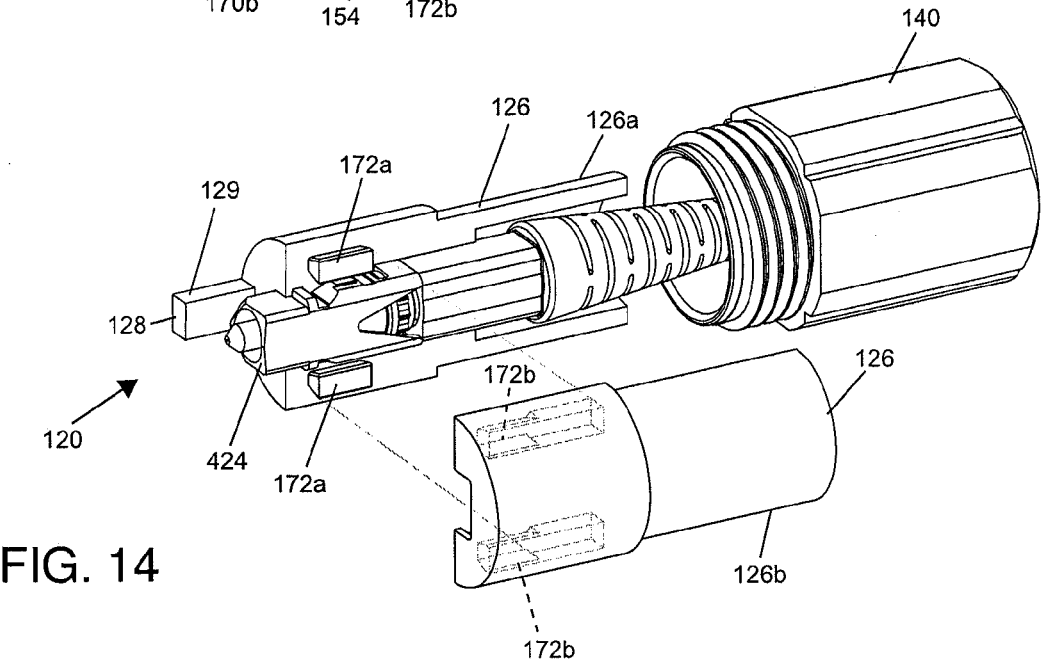
FIG. 14 is a front, side perspective view showing a first assembly step of the interface converter of FIG. 13.

Referring to FIGS. 13 and 14, the interface converter 120 includes a converter housing 126 defining a central passage 132 for receiving the connector body 424 of the fiber optic connector 422. The converter 120 also includes a coupling nut 140 rotatably mounted on the converter housing 126 for use in mechanically retaining the converter 120 within the port 526 of the fiber optic adapter 520.

The converter housing 126 of the converter 120 includes a first end 128 and an opposite second end 130. The converter housing 126 defines a central axis 131 that extends through the converter housing 126 from the first end 128 to the second end 130. The central passage 132 extends through the converter housing 126 along the central axis 131. The first end 128 of the converter housing 126 is configured to be mechanically compatible with the port 526 of the fiber optic adapter 520. For example, the first end 128 of the converter housing 126 can have a shape that complements, mates with or is otherwise mechanically compatible with the shape of the port 526. The first end 128 is also configured to secure and support the connector body 424 of the fiber optic connector 422. The second end 130 of the converter housing 126 is configured to receive or accommodate the resilient boot 452 of the fiber optic connector 422.

As indicated above, the first end 128 of the converter housing 126 has mechanical characteristics that are compatible with the internal shape of the port 526 defined by the fiber optic adapter 520. For example, the first end 128 includes an end wall 154 defining a first opening 156, and also includes keying rail 129 that projects outwardly from the end wall 154 along a direction of connector insertion 155.

The coupling nut 140 of the converter 120 is mounted at the second end 130 of the converter housing 126 and is free to rotate about the exterior of the converter housing 126 (e.g., about the central axis 131). The coupling nut 140 includes an externally threaded portion 146 and a gripping portion 148. The gripping portion 148 defines a plurality of longitudinal depressions or finger grooves 150 for facilitating grasping the gripping portion 148. The threaded portion 146 is sized to be threaded within the internal threads 550 defined within the port 526 of the fiber optic adapter 520 to secure the converter 120 within the port 526. A user can thread the threaded portion 146 of the coupling nut 140 into the internal threads 550 of the fiber optic adapter 520 by inserting the threaded portion 146 into the port 526 of the fiber optic adapter 520 and manually turning the coupling nut 140 about the converter housing 126 to thread the threaded portion 146 into the first port 526. The gripping portion 148 facilitates gripping and manually turning the coupling nut 140.

The converter housing 126 has a configuration that facilitates mounting the housing 126 over the connector body 424. For example, the converter housing 126 includes first and second half-pieces 126a, 126b that meet at a plane that extends longitudinally along the central axis 131. The half-piece 126a defines a half-passage 132a sized to fit over one half of the connector body 424 and the half-piece 126b defines a half-passage 132b that fits over the other half of the connector body 424. The half-piece 126a includes the keying rail 129, as shown in FIG. 13. The half-piece 126a includes a slot arrangement 170a adapted to engage opposite sides of the retention shoulders 432 of the connector body 424 so that the shoulders 432 are captured within the slot arrangement 170a to resist or limit relative axial movement between the connector body 424 and the converter housing 126 in two directions.

The half-piece 126b includes a stop surface 170b that abuts against the shoulders 432 but does not capture the shoulders 432. The half-pieces 126a, 126b are mechanically connected by an axial slide arrangement that includes a pair of tongues 172a provided on the half-piece 126a and a pair of grooves 172b provided on the half-piece 126b. The tongue and grooves are aligned parallel to the central axis 131 and are located at the interface between the half-pieces 126a, 126b. The half-piece 126b also includes enlarged access recesses 173b positioned at the ends of the grooves 172b for facilitating inserting the tongues 172a into the grooves 172b, as shown in FIGS. 15 and 16. By inserting the tongues 172a laterally into the recesses 173b, and then sliding the tongues 172a axially into the grooves 172b, the half-pieces 126a, 126b can be coupled together.

To mount the converter 120 on the fiber optic connector 422, the retention nut 140 is first slid over the connector 422 and onto the cable to which the connector 422 is terminated. The release sleeve 434 of the connector 422 is then removed from the connector body 424. Once the release sleeve 434 has been removed, the half-piece 126a is inserted laterally over the connector body 424 such that the retention shoulders 432 are received within the slot arrangement 170a (see FIG. 14). The half-piece 126b is then inserted laterally toward the half-piece 126a such that the connector body 424 is captured between the pieces 126a, 126b and the tongues 172a are received within the recesses 173b (see FIG. 15). The half-piece 126b is then slid axially relative to the half-piece 126a in the axial direction indicated by arrow 175 (see FIG. 16), to engage the tongues 172a with the grooves 172b. The half-piece 126b is slid axially in the direction 175 until the stop surface 170b engages the retention shoulders 432. Thereafter, the coupling nut 140 can be slid over the second end 130 of the converter 120, and the connector 422 is ready to be mounted in the port 526 of the adapter 520.

Once the fiber optic connector 422 is mounted within the converter 120, the combined components can be coupled to the fiber optic adapter 520. For example, the first end 128 of the converter 120 can be inserted within the first port 526 of the fiber optic adapter 520. As so inserted, the ferrule 430 of the connector 422 is received within the split sleeve 530 positioned within the fiber optic adapter 520, and the keying rail 129 is received within the keying slot 542. To insure that the fiber optic connector 422 is fully inserted and secured within the port 526, the threaded portion 146 of the coupling nut 140 is preferably threaded into the internal threads 550 of the fiber optic adapter 520. Threading of the threaded portion 146 into the internal threads 550 can be done manually by grasping the gripping portion 148 and manually turning the coupling nut 140. By unthreading the coupling nut 140 from the fiber optic adapter 520, and axially pulling the converter 120 from the fiber optic adapter 520, the converter 120 and the fiber optic connector 422 can be disconnected from the fiber optic adapter 520.

Figure 17:
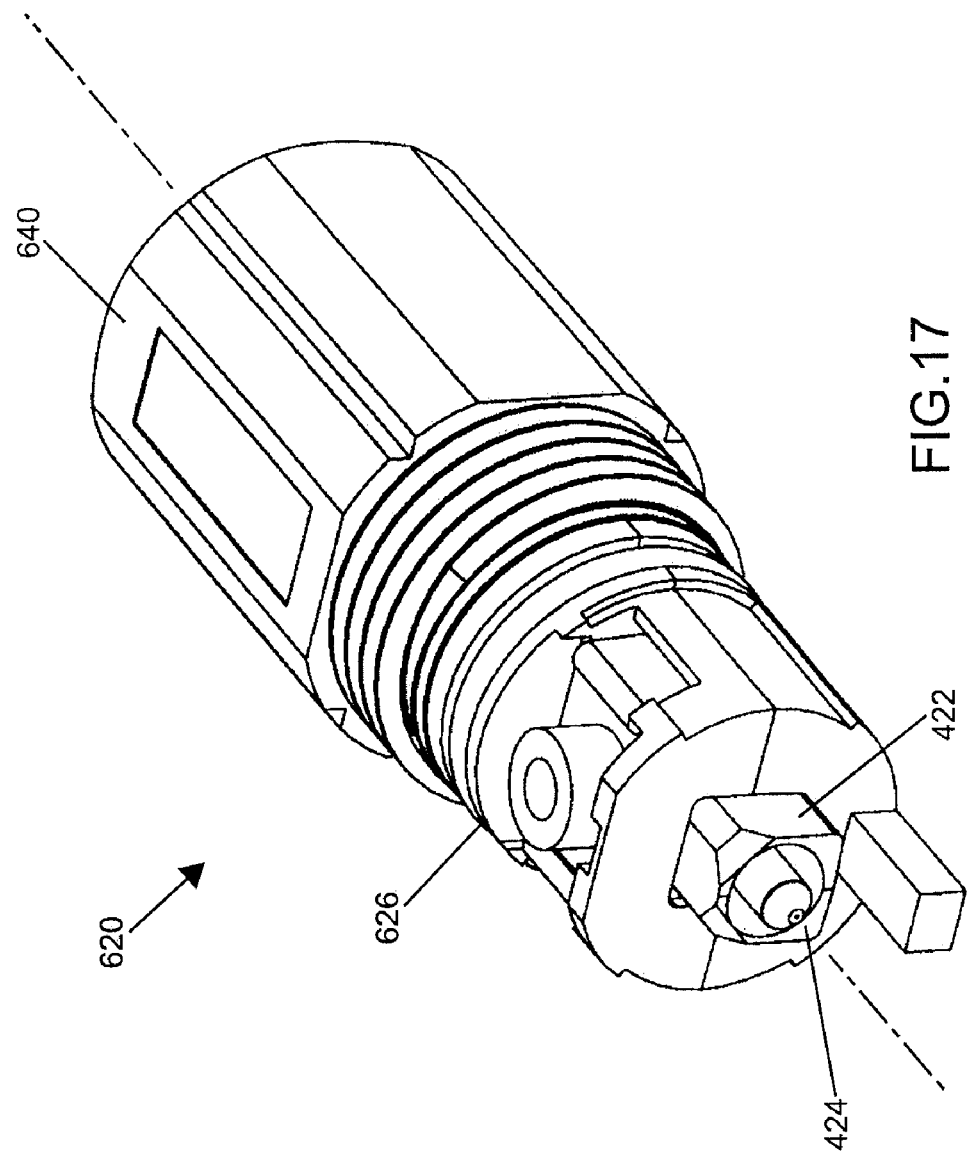
FIG. 17 is a front, side perspective view of another interface converter having features that are examples of inventive aspects in accordance with the principles of the present disclosure.

FIG. 17 shows another interface converter 620 having features that are examples of inventive aspects in accordance with the principles of the present disclosure. The interface converter 620 is also configured to make a standard fiber optic connector (e.g., the fiber optic connector 422 of FIGS. 2 through 5) compatible with the fiber optic adapter 520 of FIGS. 6 and 7. As shown at FIG. 17, the interface converter 620 includes a converter housing 626 that mounts over the connector body 424 (e.g., with the release sleeve 434 removed) of the connector 422 and provides a mechanical interface suitable for mating the fiber optic connector 422 within the port 526 of the adapter 520. The converter 620 also includes a coupling nut 640 rotatably mounted on the converter housing 626 for use in mechanically retaining the converter 620 within the port 526 of the fiber optic adapter 520.

Figure 21:
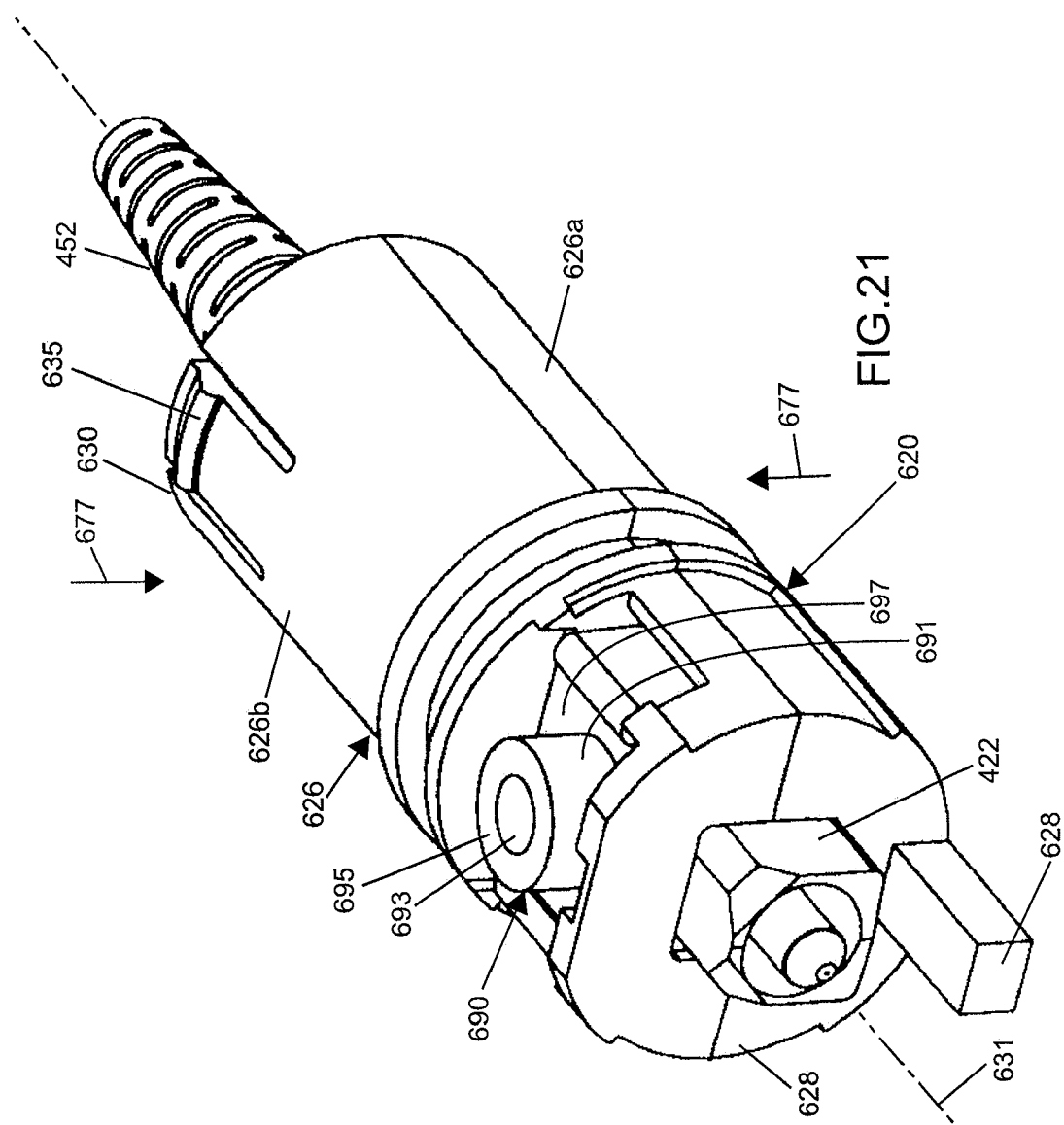
FIG. 21 shows the interface converter housing of FIG. 20 mounted over the SC connector body.

Referring to FIG. 21, the converter housing 626 of the converter 620 includes a first end 628 and an opposite second end 630. A central axis 631 extends through the converter housing 626 from the first end 628 to the second end 630. The first end 628 of the converter housing 626 is configured to be mechanically compatible with the fiber optic adapter 520. For example, the first end 628 of the converter housing 626 can have the same configuration as the first end 128 of the converter 120 of FIGS. 13 through 16. The first end 628 is also configured to secure and support the connector body 424 of the fiber optic connector 422. The second end 630 of the converter housing 626 is configured to receive or accommodate the resilient boot 452 of the fiber optic connector 422.

The coupling nut 640 of the converter 620 is mounted at the second end 630 of the converter housing 626 and is free to rotate about the exterior of the converter housing 626 (e.g., about the central axis 531). A retaining tab 635 may be included on the converter housing 626 to releasably retain the coupling nut 640 (see FIG. 21). The coupling nut 640 has the same configuration as the coupling nut 140 of the converter 120 and is configured to be manually threaded into the fiber optic adapter 520 to secure the converter 620 within the adapter 520.

Figure 18:
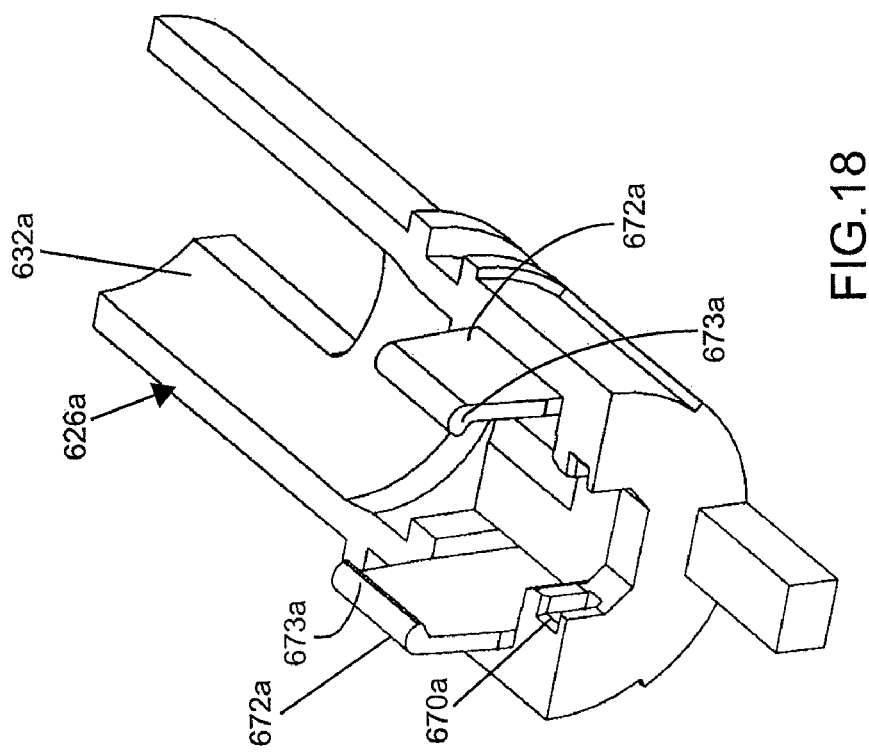
FIG. 18 shows a first half-piece of the interface converter of FIG. 17.
Figure 19:
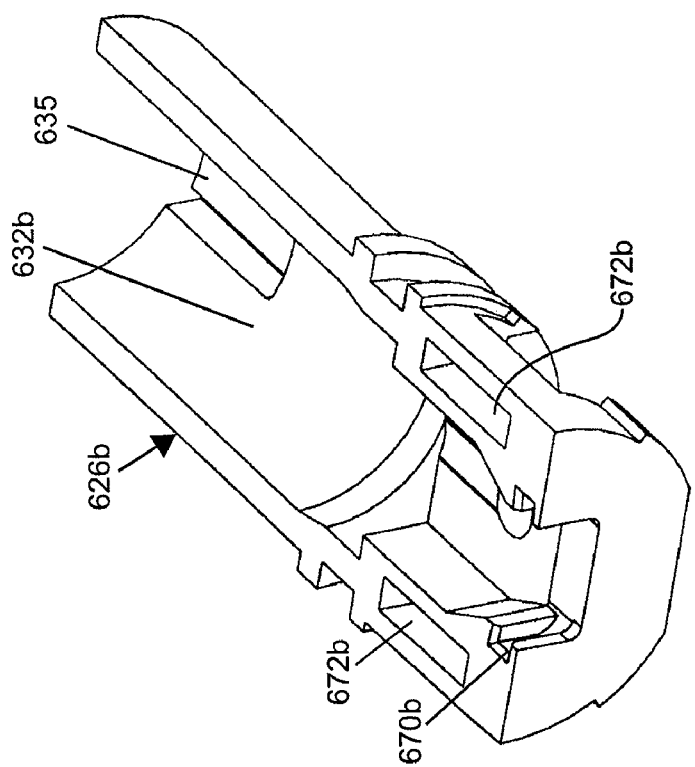
FIG. 19 shows a second half-piece of the interface converter of FIG. 17.

The converter housing 626 has a configuration that facilitates mounting the housing 626 over the connector body 424. For example, the converter housing 626 includes first and second half-pieces 626a, 626b that meet at a plane that extends longitudinally along the central axis 631. The half-piece 626a (see FIG. 18) defines a half-passage 632a sized to fit over one half of the connector body 424 and the half-piece 626b (see FIG. 19) defines a half-passage 632b that fits over the other half of the connector body 424. The half-pieces 626a, 626b include slot arrangements 670a, 670b adapted to engage opposite sides of the retention shoulders 432 of the connector body 424 so that the shoulders 432 are captured within the slot arrangements 670a, 670b to resist or limit relative movement between the connector body 424 and the converter housing 626 in either direction along the axis 631.

Figure 20:
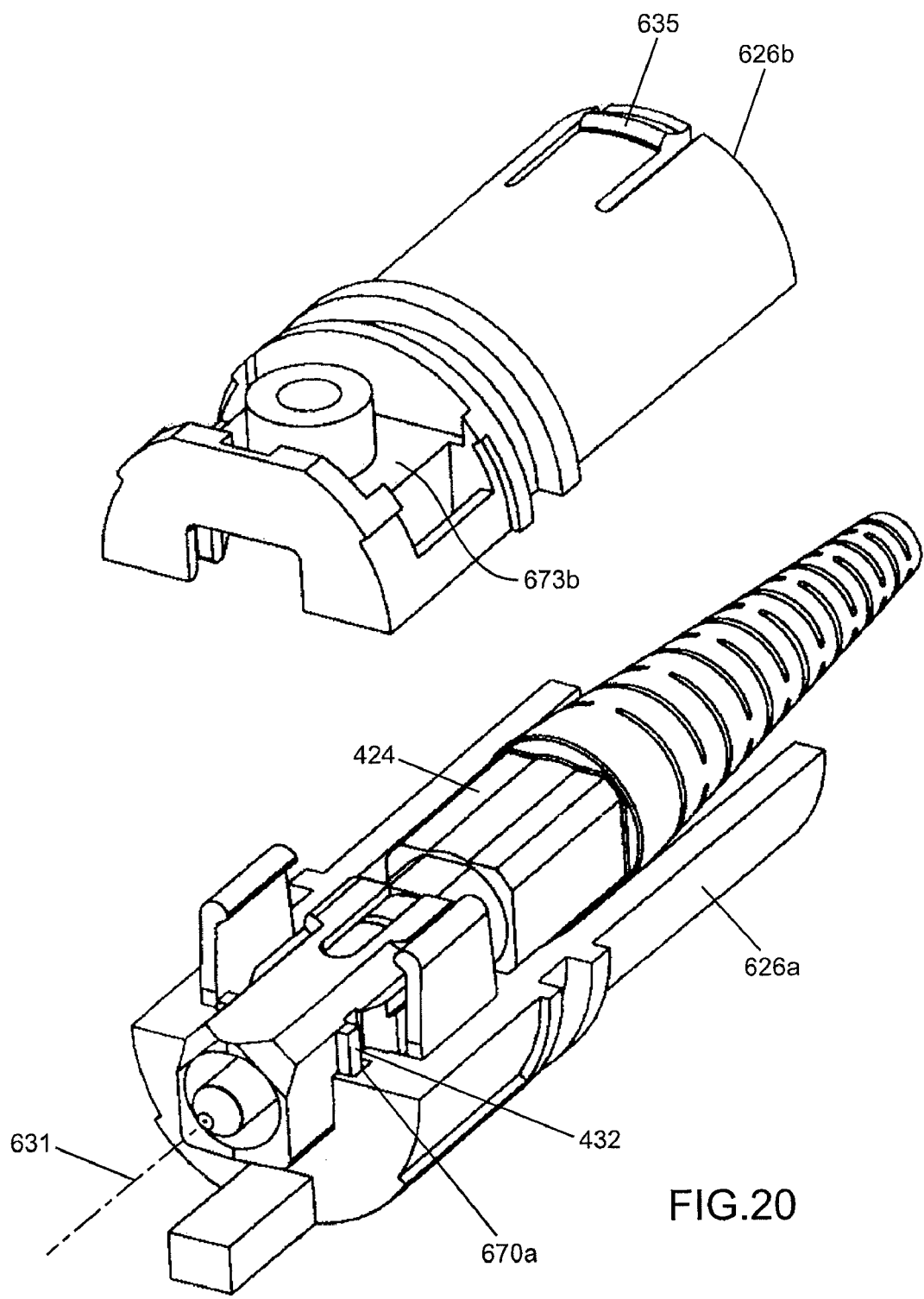
FIG. 20 shows an interface converter housing of the converter of FIG. 17 in the process of being mounted over an SC connector body.

The half-pieces 626a, 626b are mechanically connected by a snap arrangement that includes a pair of latching clips 672a provided on the half-piece 626a and a pair of clip receivers 672b provided on the half-piece 626b. The latching clips 672a include tabs 673a that engage shoulders 673b (see FIG. 20) of the clip receivers 672b when the latching clips 672a are snapped within the clip receivers 672b. The latching clips 672a each have a cantilevered configuration having a base end and a free end. The tabs 673a are provided at the free ends and the base ends are integrally formed with a main body of the half-piece 626a. The latching clips 672a extend in a direction generally perpendicular to the central axis 631 as the latching clips 672a extend from the base ends to the free ends. By inserting the clips 672a into the receivers 672b and then pressing the half-pieces 626a, 626b together (as indicated by arrows 677 shown at FIG. 21) in a direction generally perpendicular to the axis 531, the half-pieces 626a, 626b can be coupled together by a snap-fit connection. By prying/flexing the clips 672a apart from one another, the tabs 673a can be disengaged from the shoulders 673b to allow the half-pieces 626a, 626b to be disassembled.

The half-piece 626b includes an integrated tool 690 for use in removing the release sleeve 434 from the connector body 424 of the connector 422 prior to mounting the converter 620 over the connector body 424. The integrated tool 690 includes a lateral projection 691 defining a clearance opening 693 sized for receiving the ferrule 430 of the connector 422. The projection 691 includes a bearing force surface 695 that surrounds the opening 693. In one embodiment, the projection has an outer shape that generally matches the outer shape of the first end 426 of the connector body 424. In another embodiment, shown in FIGS. 17 and 20 through 23, the projection 691 is cylindrical. A recessed region 697 surrounds the projection 691.

Figure 22:
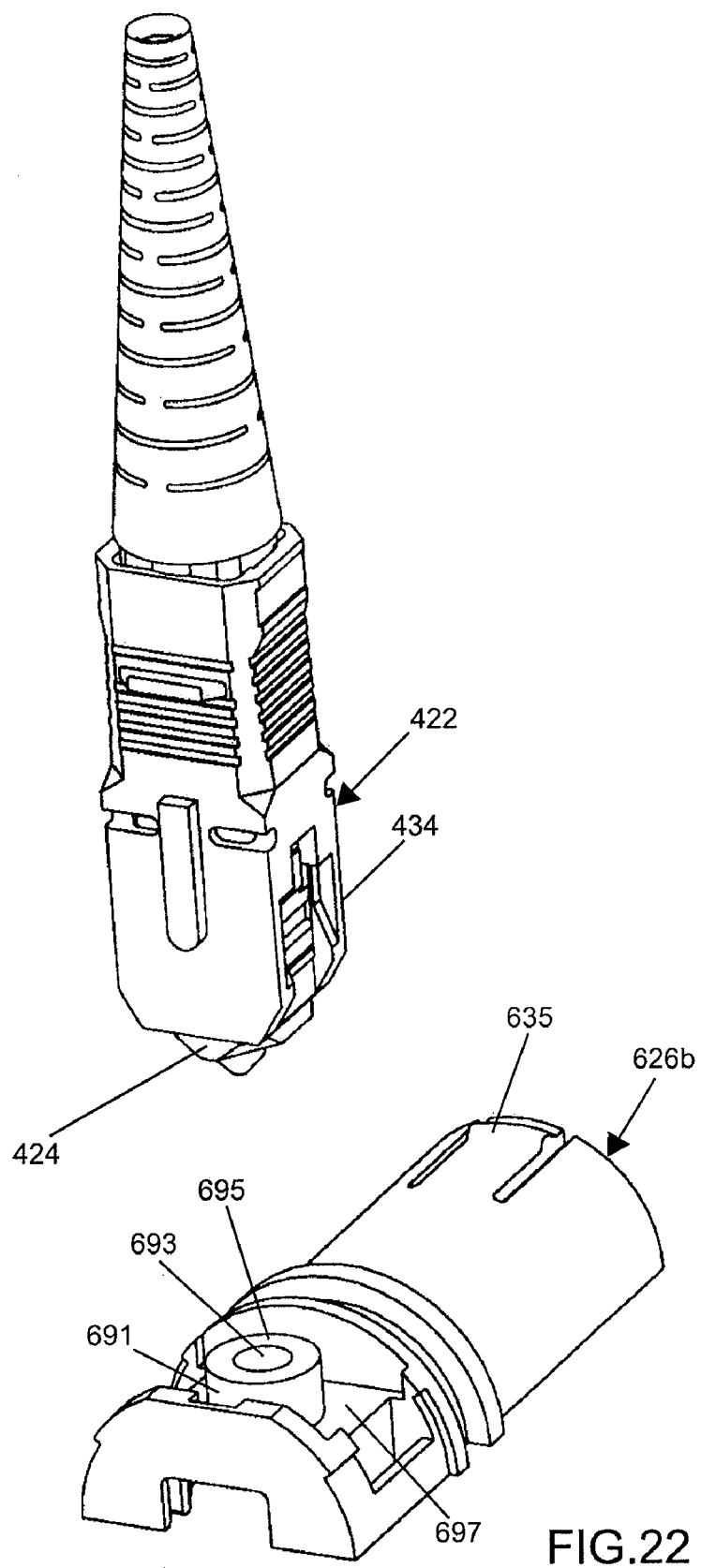
FIG. 22 shows an SC connector in alignment with a release sleeve removal tool that is integral with the interface converter housing of the interface converter.
Figure 23:
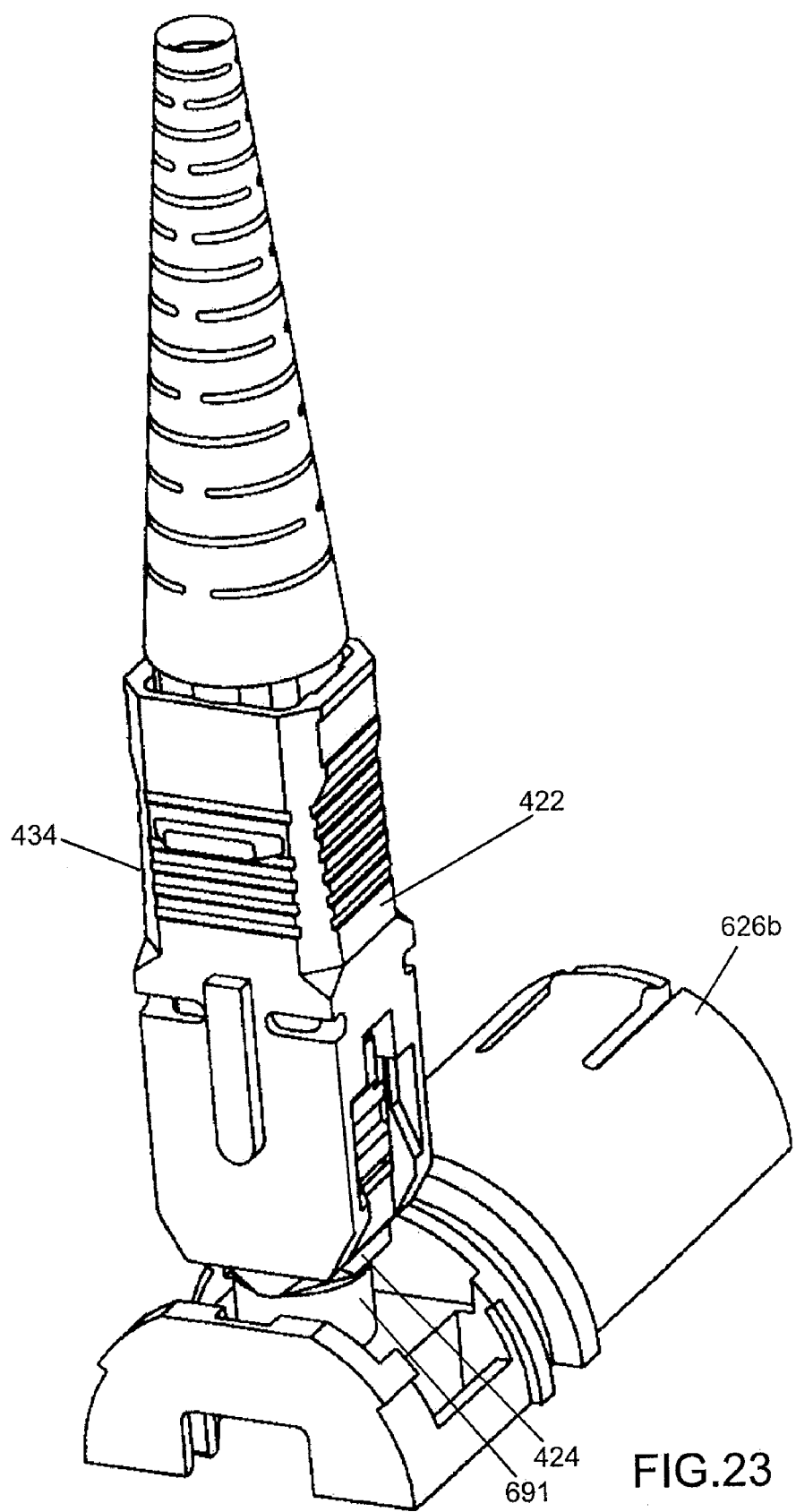
FIG. 23 shows the SC connector of FIG. 22 with the ferrule of the connector inserted within a clearance opening of the release sleeve removal tool.

In use of the tool 690, the half-piece 626b is placed on a firm, flat surface with the bearing force surface 695 of the projection 691 facing upwardly (see FIG. 22). A dust cap is then removed from the ferrule 430 of the connector 422 and the ferrule 430 inserted in the clearance opening 693 with the connector 422 extending vertically upwardly from the projection 691 (see FIG. 23). If the outer shape of the projection requires, the connector 422 is rotated about its central axis 454 (see FIG. 2) until the outer shape of the connector body 424 is in alignment with the outer shape of the projection. If the outer shape of the projection 691 does not require (see FIG. 22), the connector 422 may assume any orientation about its central axis 454 so long as the outer shape of the release sleeve 434 fits within the recessed region 697.

Figure 32:
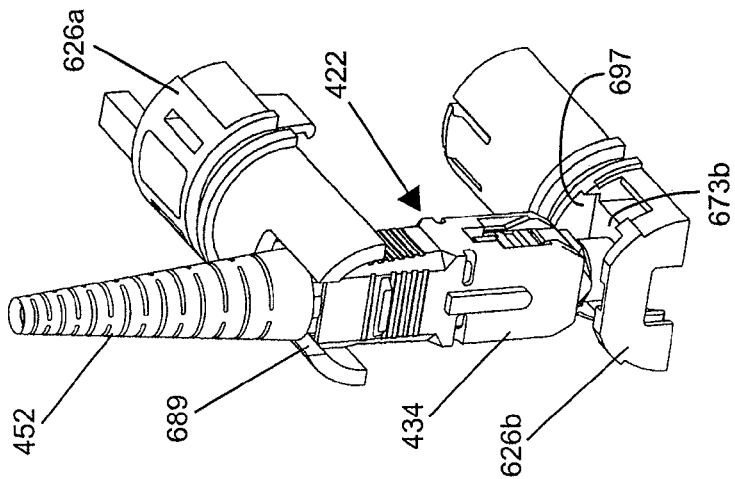
FIG. 32 shows the SC connector of FIG. 22 with the ferrule of the connector inserted within the clearance opening of the release sleeve removal tool of FIG. 22 and a pushing tool mounted over the release sleeve.

In certain embodiments, a pushing tool 689 is integrated with the half-piece 626a. Certain forms of the pushing tool 689 have a slot shape, which both allows placement around the fiber optic cable 450 and engages the release sleeve 434 (see FIGS. 32 through 34). Other forms of the pushing tool have a slot shape, which allows placement around the fiber optic cable 450, intersecting with a cylindrical shape, that engages the release sleeve 434 (not shown). The pushing tool 689 may optionally be mounted over the release sleeve 434.

Figure 24:
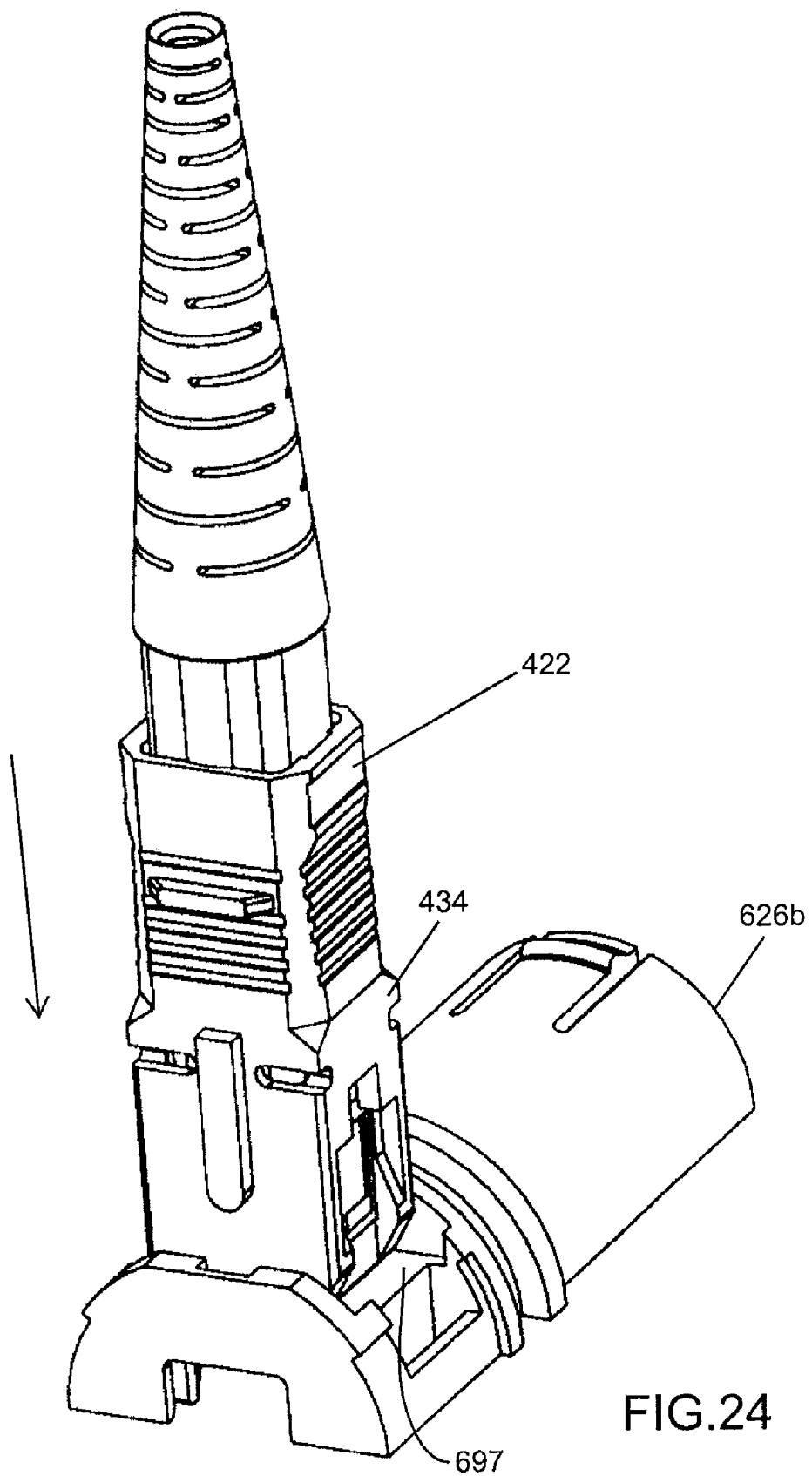
FIG. 24 shows the SC connector of FIG. 22 with the release sleeve being forced downwardly into a recess of the release sleeve removal tool to cause the release sleeve to disengage from the connector body of the SC connector.
Figure 25:
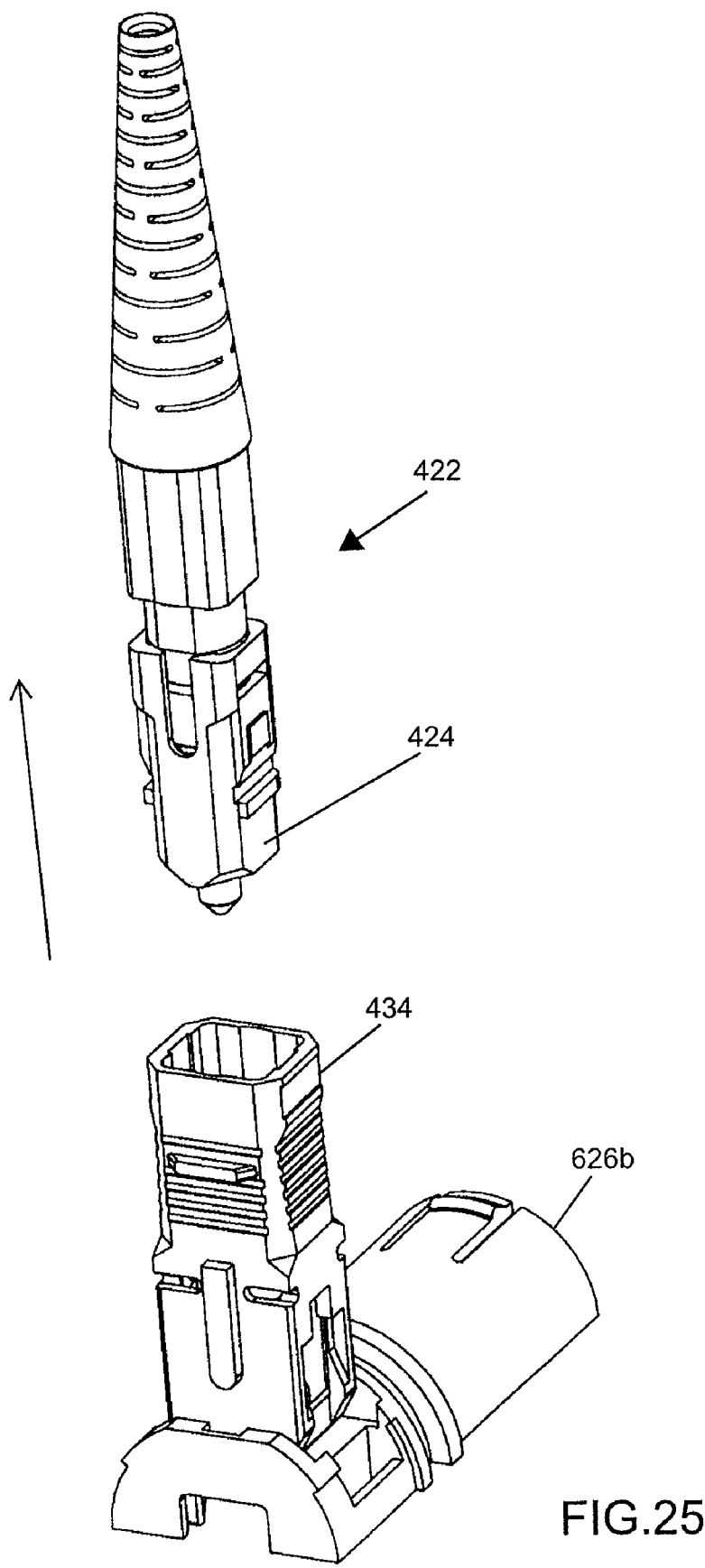
FIG. 25 shows the SC connector of FIG. 22 with the connector body being withdrawn from the release sleeve.
Figure 33:
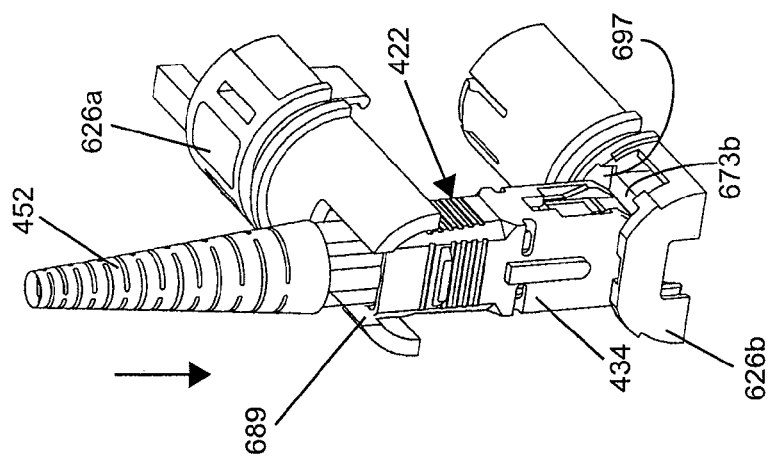
FIG. 33 shows the SC connector of FIG. 22 with the release sleeve being forced downwardly by the pushing tool of FIG. 32 into the recess of the release sleeve removal tool of FIG. 22 to cause the release sleeve to disengage from the connector body of the SC connector.
Figure 34:
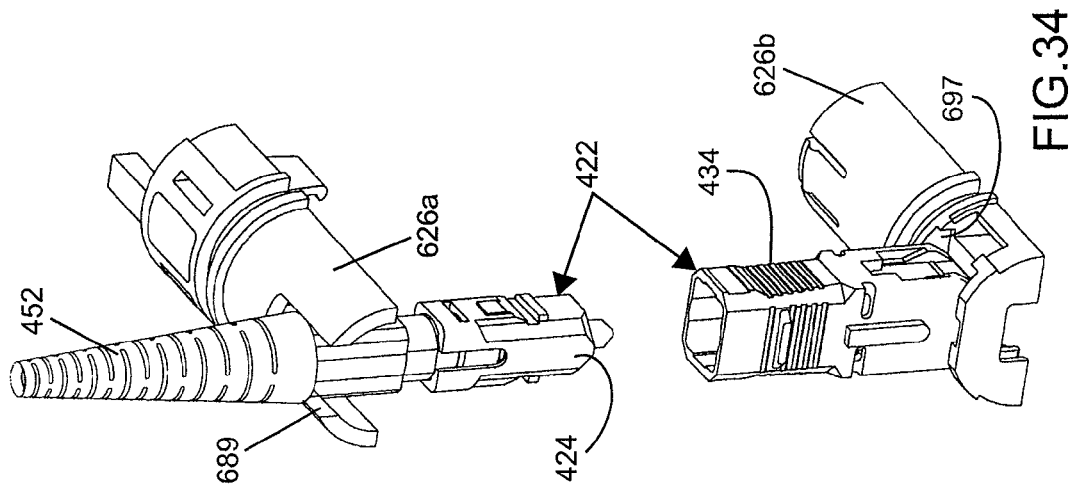
FIG. 34 shows the SC connector of FIG. 22 with the connector body being withdrawn from the release sleeve by the pushing tool of FIG. 32.

After properly positioning the connector 422, the release sleeve 434 is pushed downwardly (see FIGS. 24 and 33). As the release sleeve 434 is pushed downwardly, the end face of the connector body 424 bears against the bearing force surface 695 of the projection 691 and the release sleeve 434 slides over the projection 691 and into the recessed region 697. By this action, which generates relative linear movement between the release sleeve 434 and the connector body 424, the release sleeve 434 is disengaged from the connector body 424. The connector body 424 can then be drawn out from the release sleeve 434 by pulling up on the connector body 424 or optionally the pushing tool 689 (see FIGS. 25 and 34). The opening 693 is preferably deep enough to protect the end face of the ferrule 430 by preventing the end face from being pressed against another surface during removal of the release sleeve 434 (i.e., the ferrule does not "bottom-out" within the opening when the end face of the connector body 424 is seated on the bearing force surface 695).

To mount the converter 620 on the fiber optic connector 422, the release sleeve 434 of the connector 422 is removed from the connector body 424. The integrated tools 689 and 690 may be optionally used, as described above. Once the release sleeve 434 has been removed, the retention nut 640 is slid over the connector 422 and onto the cable to which the connector 422 is terminated. The half-piece 626a is inserted laterally over the connector body 424 such that the retention shoulders 432 of the connector body 424 are received within the slot arrangement 670a (see FIG. 20). When fully inserted, about half of the shoulders 432 are held within the slot arrangement 670a. The half-piece 626b is then inserted laterally toward the half-piece 626a such that the other halves of the retention shoulders 432 of the connector body 424 are received within the slot arrangement 670b and the connector body 424 is captured between the pieces 626a and 626b (see FIG. 21). Also, the latching clips 672a are received within the receivers 672b to provide a snap-fit connection between the pieces 626a, 626b as the pieces 626a, 626b are pushed laterally together. Preferably, the snap-fit latching arrangement provides both an audible indication (i.e., a "snap") and a visual indication that the pieces 626a, 626b are latched together. The retention nut 640 is then slid over the second end of the converter housing 626 to complete the assembly process (see FIG. 17). Once the fiber optic connector 422 is mounted within the converter 620, the combined components can be coupled to and uncoupled from the fiber optic adapter 520 is the same manner described with respect to the converter 120.

Figure 26:
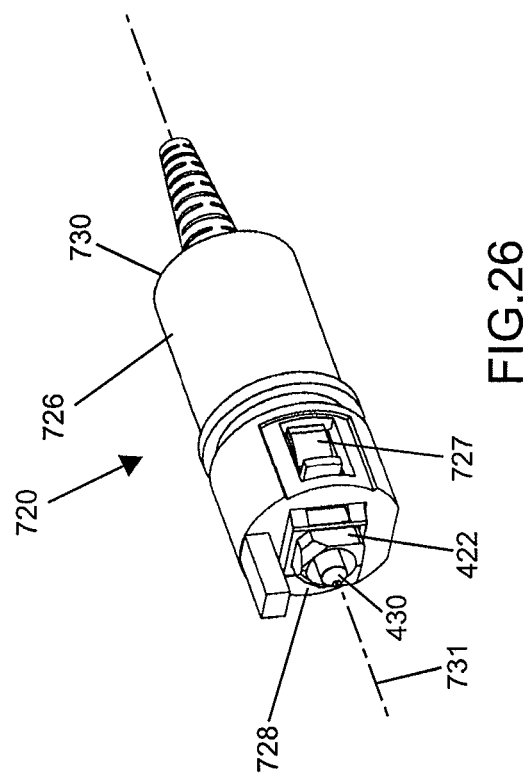
FIG. 26 is a front, side perspective view of a further interface converter having features that are examples of inventive aspects in accordance with the principles of the present disclosure.
Figure 28:
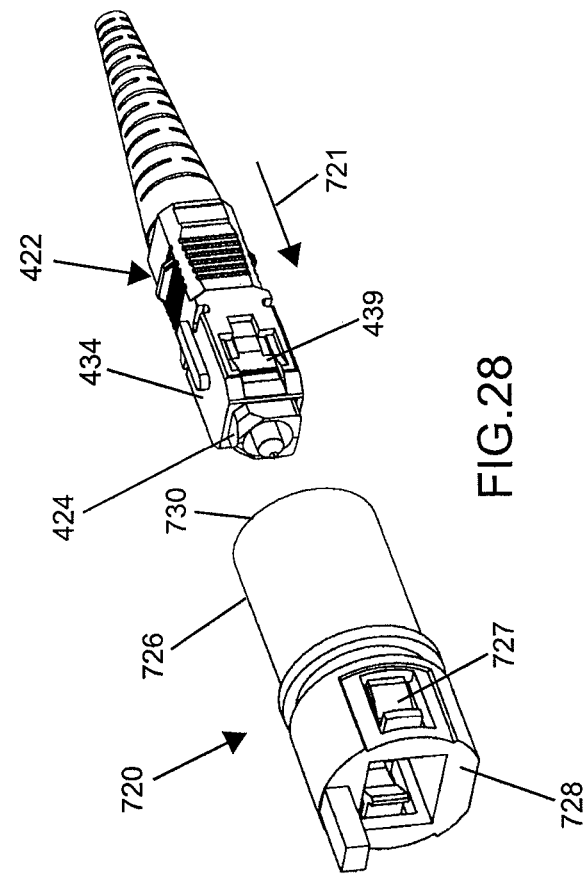
FIG. 28 is a front, side perspective view showing an SC connector in alignment behind the converter housing of FIG. 26.
Figure 27:
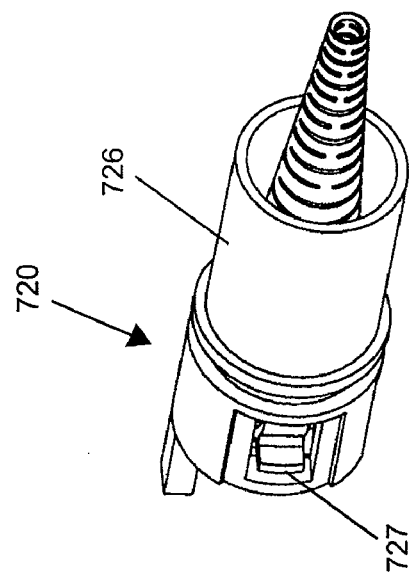
FIG. 27 is a rear, side perspective view of the interface converter of FIG. 26.
Figure 29:
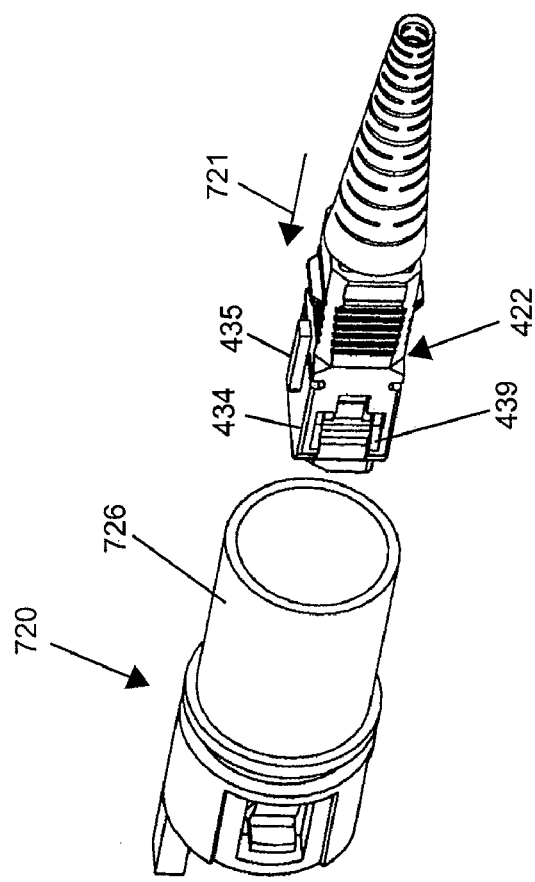
FIG. 29 is a rear, side perspective view showing the SC connector in alignment behind the converter housing of FIG. 26.
Figure 31:
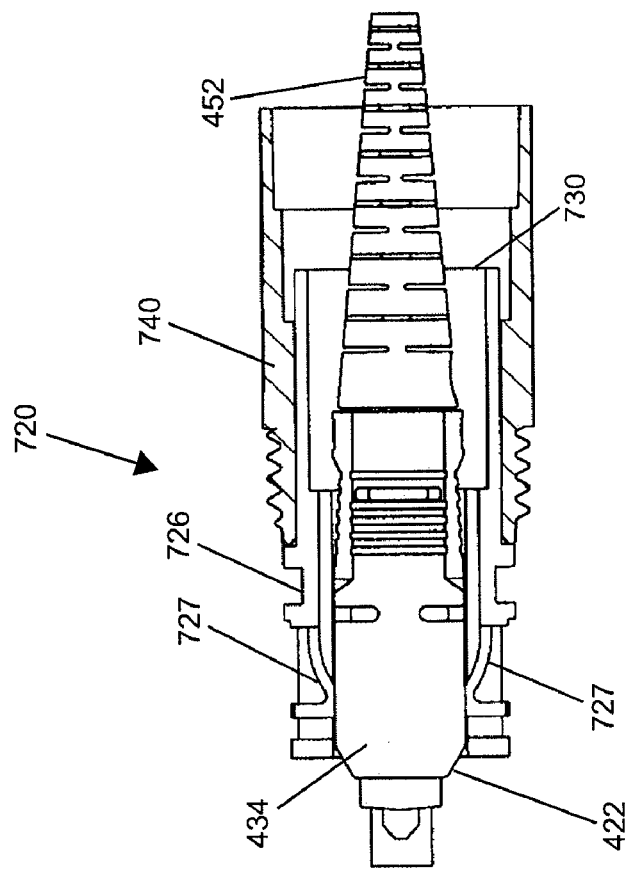
FIG. 31 shows the cross-sectional view of FIG. 30 with an SC connector mounted within the interface converter.
Figure 30:
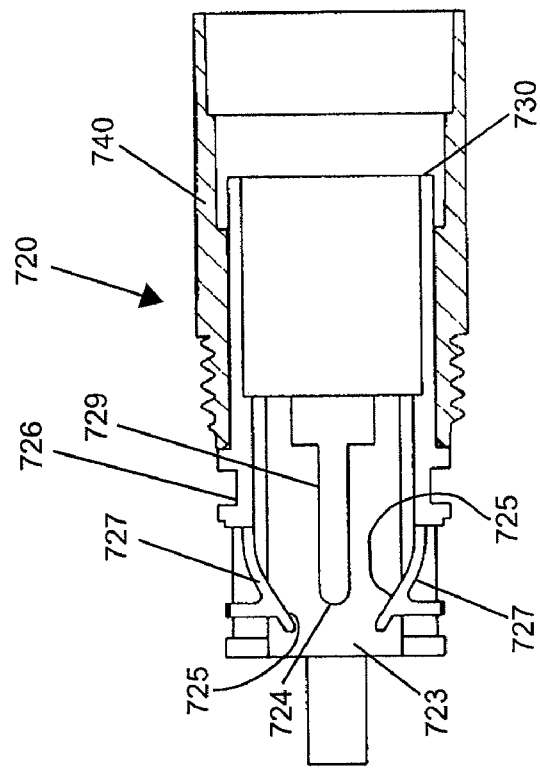
FIG. 30 is a cross-sectional view cut lengthwise through the interface converter of FIG. 26.

FIGS. 26 through 31 show still another interface converter 720 having features that are examples of inventive aspects in accordance with the principles of the present disclosure. The interface converter 720 is also configured to make a standard fiber optic connector (e.g., the fiber optic connector 422 of FIGS. 2 through 5) compatible with the fiber optic adapter 520 of FIGS. 6 and 7. As shown at FIG. 26, the interface converter 720 includes a converter housing 726 that mounts over the connector 422 (e.g., with the release sleeve 434 in place on the connector body 424) and provides a mechanical interface suitable for mating the fiber optic connector 422 within the adapter 520. The converter 720 also includes a coupling nut 740 (see FIGS. 30 and 31) rotatably mounted on the converter housing 726 for use in mechanically retaining the converter 720 within the fiber optic adapter 520.

The converter housing 726 of the converter 720 includes a first end 728 and an opposite second end 730. A central axis 731 extends through the converter housing 726 from the first end 728 to the second end 730. The first end 728 of the converter housing 726 is configured to be mechanically compatible with the fiber optic adapter 520. For example, the first end 728 of the converter housing 726 can have the same configuration as the first end 128 of the converter 120 of FIGS. 13 through 16. The first end 728 is also configured to provide access to the ferrule 430 located at the end of the fiber optic connector 422. The second end 730 of the converter housing 726 is configured to receive or accommodate the resilient boot 452 of the fiber optic connector 422.

The coupling nut 740 of the converter 720 is mounted at the second end 730 of the converter housing 726 (see FIGS. 30 and 31) and is free to rotate about the exterior of the converter housing 726 (e.g., about the central axis 731). The coupling nut 740 has the same configuration as the coupling nut 140 of the converter 120 and is configured to be manually threaded into the adapter 520 to secure the converter 720 within the adapter 520.

The converter housing 726 has a one-piece configuration and includes flexible, snap-fit latches 727 to secure the fiber optic connector 422 within the converter housing 726. To mount the converter 720 on the fiber optic connector 422, the fiber optic connector 422 is inserted axially into the converter housing 726 through the second end 730 as indicated by arrows 721 shown at FIGS. 28 and 29. The coupling nut 740 can be mounted at the second end 730 of the converter housing 726 at the time the connector 422 is inserted into the second end 730 of the converter housing 726. The housing 726 includes an internal axial slot 729 (see FIG. 30) sized for receiving the keying rail 435 of the release sleeve 434 and an internal passage 723 sized for receiving the release sleeve 434 when the fiber optic connector 422 is inserted into the converter housing 726. Mating of the keying rail 435 and the slot 729 insures that the connector 422 is oriented in the proper rotational position during insertion of the connector 422 into the converter housing 726. As the fiber optic connector 422 is inserted into the converter housing 726, ramped interior surfaces 725 of the snap-fit latches 727 are initially spread apart by the fiber optic connector 422 and flex to allow passage of the fiber optic connector 422. As the insertion continues, the latches 727 pass over openings 439 defined through the release sleeve 434. The openings 439 allow the latches 727 to at least partially un-flex and project though the openings 439 and engage the retention shoulders 432 provided on the connector body 424. Sloping surfaces 433 (see FIG. 4) provide clearance for the ramped interior surfaces 725 as the snap-fit latches 727 un-flex and engage the retention shoulders 432. The insertion depth of the fiber optic connector 422 into the converter housing 726 is limited by the keying rail 435 of the release sleeve 434 bottoming out at an end 724 of the internal axial slot 729 of the housing 726. The connector 422 is thereby securely retained within the passage 723 between the end 724 of the internal axial slot 729 and the snap-fit latches 727 of the converter housing 726. Preferably, the snap-fit latching arrangement provides both an audible indication (i.e., a "snap") and a visual indication that the connector 422 is latched within the converter housing 726. Once the fiber optic connector 422 is mounted within the converter 720, the combined components can be coupled to and uncoupled from the fiber optic adapter 520 in the same manner described with respect to the converter 120. If desired, the connector 422 can be disconnected from the converter 720 by flexing the snap-fit latches 727 apart and withdrawing the connector 422.

From the forgoing detailed description, it will be evident that modifications and variations can be made in the devices of the disclosure without departing from the spirit or scope of the invention. As another example, the split line of the housing 126 could be rotated 90 degrees about axis 131. Moreover, while the description has been directed toward interface conversions SC style fiber optic connectors, the various aspects disclosed herein are also applicable to interface conversions for other styles of fiber optic adapters and connectors.

What is claimed is:

1. A method for converting an assembled SC connector to a different connector style, the assembled SC connector including a SC connector body, a ferrule supported by the SC connector body, and a SC release sleeve that mounts over the SC connector body, the method comprising:
    removing the SC release sleeve from the SC connector body thereby creating a sleeveless SC connector; and
    mounting a converter housing over the SC connector body after the SC release sleeve has been removed, the converter housing including an interface end that provides the sleeveless SC connector with a different mechanical interface, the converter housing including a first half-piece and a second half-piece that meet at a longitudinal plane of the SC connector body, the mounting of the converter housing including:
        aligning a retention shoulder of the SC connector body with a retaining slot of the first half-piece;
        laterally inserting the SC connector body into a half-passage of the first half-piece thereby engaging the retention shoulder of the SC connector body with the retaining slot of the first half-piece; and
        positioning the second half-piece adjacent the first half-piece such that the first and the second half-pieces meet.

2. The method of claim 1, wherein the SC release sleeve is removed with a tool that is integral with the converter housing.

3. The method of claim 1, wherein the first and the second half-pieces of the converter housing are joined by a tongue and groove configuration.

4. The method of claim 1, wherein the first and the second half-pieces of the converter housing are joined by a snap-fit configuration.

5. The method of claim 1, further comprising mounting a coupling nut on the converter housing after the first and the second half-pieces of the converter housing meet.

6. A converter for converting a non-ruggedized SC connector to a ruggedized connector, the non-ruggedized SC connector including a ferrule supported by an SC connector body and a release sleeve that mounts over the SC connector body, the converter comprising:
   a converter housing including a first end and an opposite second end, the converter housing defining a central axis that extends through the converter housing from the first end to the second end, the converter housing defining a central passage sized to receive the SC connector body with the ferrule of the non-ruggedized SC connector aligned along the central axis and located adjacent the first end of the converter housing, the first end of the converter housing being configured to interface with a ruggedized adapter;
   a coupling nut that mounts at the second end of the converter housing, the coupling nut being rotatable relative to the converter housing about the central axis;
   the converter housing including a first housing piece and a second housing piece that cooperate to define the central passage of the converter housing such that the SC connector body is retained between the first housing piece and the second housing piece when the SC connector body is mounted within the converter housing, at least one of the first and second housing pieces of the converter housing defining a slot for receiving a retention shoulder of the SC connector body to limit axial movement of the SC connector body relative to the converter housing;
   the first housing piece including an integrated tool for use in removing the release sleeve from the SC connector body;
   the first and second housing pieces including half-pieces that each generally receive one half of the SC connector body, wherein the first and second housing pieces meet at a plane that extends along the central axis from the first end to the second end of the converter housing; and
   a release sleeve pushing tool is integrated into the second housing piece, wherein the integrated tool of the first housing piece includes an opening for receiving the ferrule of the non-ruggedized SC connector and a bearing force surface for engaging an end of the SC connector body of the non-ruggedized SC connector.

7. The converter of claim 6, wherein the first housing piece includes two axial tongues and the second housing piece includes two axial grooves, and wherein the axial tongues slide axially into the axial grooves to secure the first and second housing pieces together.

8. The converter of claim 7, wherein the slot for receiving the retention shoulder of the SC connector body is provided at only one of the first and second housing pieces.

9. The converter of claim 7, wherein the second housing piece includes recessed regions positioned axially adjacent the axial grooves for laterally receiving the axial tongues of the first housing piece prior to axially sliding the axial tongues into the axial grooves.

10. The converter of claim 6, wherein the first housing piece includes two latching clips and the second housing piece includes two clip receivers that receive the latching clips to secure the first and second housing pieces together, and wherein the latching clips slide laterally into the clip receivers when the first and second housing pieces are brought together in a direction generally perpendicular to the central axis of the converter housing.

11. A converter for converting an SC connector to another connector type, the SC connector including a ferrule supported by an SC connector body and a release sleeve that mounts over the SC connector body, the converter comprising:
   a converter housing that mounts over the SC connector body, the converter housing including an integrated tool for use in removing the release sleeve from the SC connector body;
   the converter housing including first and second half-pieces that each generally receive one half of the SC connector body, wherein the first and second half-pieces meet at a plane that extends along a central axis from a first end to a second end of the converter housing, wherein the integrated tool is provided at the first half-piece; and
   a release sleeve pushing tool is integrated into the second half-piece, wherein the integrated tool of the first half-piece includes an opening for receiving the ferrule of the SC connector and a bearing force surface for engaging an end of the SC connector body of the SC connector.

12. A converter for converting an SC connector to another connector type, the SC connector including a ferrule supported by an SC connector body and a release sleeve that mounts over the SC connector body, the converter comprising:
   a converter housing that mounts over the SC connector body, the converter housing including an integrated tool for use in removing the release sleeve from the SC connector body;
   the converter housing including first and second housing pieces between which the SC connector body is mounted, wherein the integrated tool is provided at the first housing piece; and
   a release sleeve pushing tool is integrated into the second housing piece, wherein the integrated tool of the first housing piece includes an opening for receiving the ferrule of the SC connector and a bearing force surface for engaging an end of the SC connector body of the SC connector.

13. The converter of claim 12, wherein the release sleeve pushing tool includes a slot formed in the second housing piece for engaging the release sleeve.

14. A converter for converting an SC connector to another connector type, the SC connector including a ferrule supported by an SC connector body and a release sleeve that mounts over the SC connector body, the converter comprising:
   a converter housing that mounts over the SC connector body, the converter housing including an integrated tool for use in removing the release sleeve from the SC connector body; and
   the integrated tool including a clearance opening for receiving the ferrule of the SC connector and a bearing force surface for engaging an end of the SC connector body of the SC connector.

15. The converter of claim 14, wherein the clearance opening is defined within a lateral projection provided on the converter housing, and wherein the lateral projection is sized to fit within an end of the release sleeve.

16. The converter of claim 15, wherein a recessed region surrounds the bearing force surface.

* * * * *